United States Patent
Raleigh

(10) Patent No.: US 8,391,834 B2
(45) Date of Patent: Mar. 5, 2013

(54) SECURITY TECHNIQUES FOR DEVICE ASSISTED SERVICES

(75) Inventor: Gregory G. Raleigh, Woodside, CA (US)

(73) Assignee: Headwater Partners I LLC, Redwood Shores, CA (US)

( * ) Notice: Subject to any disclaimer, the term of this patent is extended or adjusted under 35 U.S.C. 154(b) by 316 days.

(21) Appl. No.: 12/694,445

(22) Filed: Jan. 27, 2010

(65) Prior Publication Data
US 2010/0199325 A1    Aug. 5, 2010

Related U.S. Application Data

(63) Continuation-in-part of application No. 12/380,780, filed on Mar. 2, 2009.

(60) Provisional application No. 61/206,354, filed on Jan. 28, 2009, provisional application No. 61/206,944, (Continued)

(51) Int. Cl.
*H04M 11/00* (2006.01)
*H04M 15/00* (2006.01)

(52) U.S. Cl. .............. 455/407; 455/414.1; 455/456.1; 705/34

(58) Field of Classification Search .............. 370/468, 370/252; 455/461, 406, 407, 408, 414.1, 455/418, 419, 456.1, 456.6; 705/30, 34; 709/203, 217, 223, 224
See application file for complete search history.

(56) References Cited

U.S. PATENT DOCUMENTS

| 5,283,904 | A |   | 2/1994  | Carson et al.    |         |
|-----------|---|---|---------|------------------|---------|
| 5,577,100 | A |   | 11/1996 | McGregor et al.  |         |
| 5,594,777 | A |   | 1/1997  | Makkonen et al.  |         |
| 5,794,142 | A |   | 8/1998  | Vanttila et al.  |         |
| 5,892,900 | A |   | 4/1999  | Ginter et al.    |         |
| 5,903,845 | A | * | 5/1999  | Buhrmann et al.  | 455/461 |
| 5,933,778 | A | * | 8/1999  | Buhrmann et al.  | 455/461 |

(Continued)

FOREIGN PATENT DOCUMENTS

| EP | 1463238 | 9/2004 |
| EP | 1739518 | 6/2005 |

(Continued)

OTHER PUBLICATIONS

Knight et al., Layer 2 and 3 Virtual Private Networks: Taxonomy, Technology, and Standardization Efforts, IEEE Communications Magazine, Jun. 2004.

(Continued)

*Primary Examiner* — Andrew Joseph Rudy
(74) *Attorney, Agent, or Firm* — Krista S. Jacobsen; Sheppard, Mullin, Richter & Hampton LLP

(57) ABSTRACT

Security techniques for device assisted services are provided. In some embodiments, secure service measurement and/or control execution partition is provided. In some embodiments, implementing a service profile executed at least in part in a secure execution environment of a processor of a communications device for assisting control of the communications device use of a service on a wireless network, in which the service profile includes a plurality of service policy settings, and wherein the service profile is associated with a service plan that provides for access to the service on the wireless network; monitoring use of the service based on the service profile; and verifying the use of the service based on the monitored use of the service.

62 Claims, 11 Drawing Sheets

Related U.S. Application Data filed on Feb. 4, 2009, provisional application No. 61/207,393, filed on Feb. 10, 2009, provisional application No. 61/207,739, filed on Feb. 13, 2009, provisional application No. 61/252,151, filed on Oct. 15, 2009.

(56) References Cited

U.S. PATENT DOCUMENTS

| | | |
|---|---|---|
| 5,940,472 A | 8/1999 | Newman et al. |
| 6,038,452 A | 3/2000 | Strawczynski et al. |
| 6,047,268 A | 4/2000 | Bartoli et al. |
| 6,078,953 A | 6/2000 | Vaid et al. |
| 6,098,878 A | 8/2000 | Dent et al. |
| 6,141,686 A | 10/2000 | Jackowski et al. |
| 6,148,336 A | 11/2000 | Thomas et al. |
| 6,198,915 B1 | 3/2001 | McGregor et al. |
| 6,226,277 B1 | 5/2001 | Chuah |
| 6,263,055 B1 | 7/2001 | Garland et al. |
| 6,317,584 B1 * | 11/2001 | Abu-Amara et al. ........ 455/12.1 |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,603,969 B1 | 8/2003 | Vuoristo et al. |
| 6,606,744 B1 | 8/2003 | Mikurak |
| 6,631,122 B1 | 10/2003 | Arunachalam et al. |
| 6,639,975 B1 | 10/2003 | O'Neal et al. |
| 6,650,887 B2 | 11/2003 | McGregor et al. |
| 6,651,101 B1 | 11/2003 | Gai et al. |
| 6,658,254 B1 | 12/2003 | Purdy et al. |
| 6,678,516 B2 | 1/2004 | Nordman et al. |
| 6,683,853 B1 | 1/2004 | Carlsson et al. |
| 6,684,244 B1 | 1/2004 | Goldman et al. |
| 6,725,031 B2 | 4/2004 | Watler et al. |
| 6,763,000 B1 | 7/2004 | Walsh |
| 6,765,864 B1 | 7/2004 | Natarajan et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,876,653 B2 | 4/2005 | Ambe et al. |
| 6,920,455 B1 | 7/2005 | Weschler |
| 6,922,562 B2 | 7/2005 | Ward et al. |
| 6,952,428 B1 | 10/2005 | Necka et al. |
| 6,965,667 B2 | 11/2005 | Trabandt et al. |
| 6,967,958 B2 | 11/2005 | Ono et al. |
| 6,996,076 B1 | 2/2006 | Forbes et al. |
| 6,998,985 B2 | 2/2006 | Reisman et al. |
| 7,002,920 B1 | 2/2006 | Ayyagari et al. |
| 7,024,200 B2 * | 4/2006 | McKenna et al. .......... 455/452.1 |
| 7,027,408 B2 | 4/2006 | Nabkel et al. |
| 7,042,988 B2 | 5/2006 | Juitt et al. |
| 7,058,968 B2 | 6/2006 | Rowland et al. |
| 7,068,600 B2 | 6/2006 | Cain |
| 7,069,248 B2 | 6/2006 | Huber |
| 7,092,696 B1 | 8/2006 | Hosain et al. |
| 7,113,997 B2 | 9/2006 | Jayapalan et al. |
| 7,142,876 B2 | 11/2006 | Trossen et al. |
| 7,158,792 B1 | 1/2007 | Cook et al. |
| 7,174,174 B2 | 2/2007 | Boris et al. |
| 7,180,855 B1 | 2/2007 | Lin |
| 7,197,321 B2 | 3/2007 | Erskine et al. |
| 7,212,491 B2 | 5/2007 | Koga |
| 7,228,354 B2 | 6/2007 | Chambliss et al. |
| 7,242,920 B2 | 7/2007 | Morris |
| 7,245,901 B2 | 7/2007 | McGregor et al. |
| 7,251,218 B2 | 7/2007 | Jorgensen |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,289,489 B1 | 10/2007 | Kung et al. |
| 7,290,283 B2 | 10/2007 | Copeland, III |
| 7,317,699 B2 | 1/2008 | Godfrey et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,349,695 B2 | 3/2008 | Oommen et al. |
| 7,353,533 B2 | 4/2008 | Wright et al. |
| 7,356,337 B2 | 4/2008 | Florence |
| 7,366,497 B2 | 4/2008 | Nagata |
| 7,373,136 B2 | 5/2008 | Watler et al. |
| 7,388,950 B2 | 6/2008 | Elsey et al. |
| 7,401,338 B1 | 7/2008 | Bowen et al. |
| 7,403,763 B2 | 7/2008 | Maes |
| 7,418,253 B2 | 8/2008 | Kavanah |
| 7,418,257 B2 | 8/2008 | Kim |
| 7,421,004 B2 | 9/2008 | Feher |
| 7,450,591 B2 | 11/2008 | Korling et al. |
| 7,450,927 B1 | 11/2008 | Creswell et al. |
| 7,486,185 B2 | 2/2009 | Culpepper et al. |
| 7,499,537 B2 | 3/2009 | Elsey et al. |
| 7,515,608 B2 | 4/2009 | Yuan et al. |
| 7,516,219 B2 | 4/2009 | Moghaddam et al. |
| 7,546,629 B2 | 6/2009 | Albert et al. |
| 7,574,731 B2 | 8/2009 | Fascenda |
| 7,580,857 B2 | 8/2009 | VanFleet et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,668,176 B2 | 2/2010 | Chuah |
| 7,668,903 B2 | 2/2010 | Edwards et al. |
| 7,685,131 B2 | 3/2010 | Batra et al. |
| 7,693,720 B2 | 4/2010 | Kennewick et al. |
| 7,710,932 B2 | 5/2010 | Muthuswamy et al. |
| 7,720,505 B2 | 5/2010 | Gopi et al. |
| 7,734,784 B1 | 6/2010 | Araujo et al. |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,534 B2 | 7/2010 | Anupam et al. |
| 7,778,643 B2 | 8/2010 | Laroia et al. |
| 7,792,538 B2 | 9/2010 | Kozisek |
| 7,792,708 B2 | 9/2010 | Alva |
| 7,797,204 B2 | 9/2010 | Balent |
| 7,797,401 B2 | 9/2010 | Stewart et al. |
| 7,801,523 B1 | 9/2010 | Kenderov |
| 7,822,837 B1 | 10/2010 | Urban et al. |
| 7,844,728 B2 | 11/2010 | Anderson et al. |
| 7,848,768 B2 | 12/2010 | Omori et al. |
| 7,856,226 B2 | 12/2010 | Wong et al. |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,903,553 B2 | 3/2011 | Liu |
| 7,911,975 B2 | 3/2011 | Droz et al. |

| | | |
|---|---|---|
| 7,912,025 B2 | 3/2011 | Pattenden et al. |
| 7,912,056 B1 | 3/2011 | Brassem |
| 7,920,529 B1 | 4/2011 | Mahler et al. |
| 7,929,960 B2 | 4/2011 | Martin et al. |
| 7,937,069 B2 | 5/2011 | Rassam |
| 7,941,184 B2 | 5/2011 | Prendergast et al. |
| 7,945,240 B1 | 5/2011 | Klock et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,957,511 B2 | 6/2011 | Drudis et al. |
| 7,970,426 B2 | 6/2011 | Poe et al. |
| 7,975,184 B2 | 7/2011 | Goff et al. |
| 7,984,130 B2 | 7/2011 | Bogineni et al. |
| 7,986,935 B1 | 7/2011 | D'Souza et al. |
| 8,005,459 B2 | 8/2011 | Balsillie |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,023,425 B2 * | 9/2011 | Raleigh .......... 370/252 |
| 8,050,275 B1 | 11/2011 | Iyer |
| 8,064,896 B2 | 11/2011 | Bell et al. |
| 8,068,824 B2 | 11/2011 | Shan et al. |
| 8,095,666 B2 | 1/2012 | Schmidt et al. |
| 8,099,077 B2 | 1/2012 | Chowdhury et al. |
| 8,099,517 B2 | 1/2012 | Jia et al. |
| 8,108,520 B2 | 1/2012 | Ruutu et al. |
| 8,126,123 B2 | 2/2012 | Cai et al. |
| 8,135,392 B2 | 3/2012 | Marcellino et al. |
| 8,144,591 B2 | 3/2012 | Ghai et al. |
| 8,155,620 B2 | 4/2012 | Wang et al. |
| 8,160,015 B2 | 4/2012 | Rashid et al. |
| 8,170,553 B2 | 5/2012 | Bennett |
| 8,184,530 B1 | 5/2012 | Swan et al. |
| 8,185,152 B1 | 5/2012 | Goldner |
| 8,185,158 B2 | 5/2012 | Tamura et al. |
| 8,190,675 B2 | 5/2012 | Tribbett |
| 8,194,549 B2 | 6/2012 | Huber et al. |
| 8,194,553 B2 | 6/2012 | Liang et al. |
| 8,200,775 B2 | 6/2012 | Moore |
| 8,208,919 B2 | 6/2012 | Kotecha |
| 8,213,363 B2 | 7/2012 | Ying et al. |
| 8,214,536 B2 | 7/2012 | Zhao |
| 8,238,287 B1 | 8/2012 | Gopi et al. |
| 8,239,520 B2 | 8/2012 | Grah et al. |
| 8,244,241 B2 | 8/2012 | Montemurro |
| 8,254,915 B2 | 8/2012 | Kozisek |
| 8,255,515 B1 | 8/2012 | Melman et al. |
| 8,255,689 B2 | 8/2012 | Kim et al. |
| 8,271,049 B2 | 9/2012 | Silver et al. |
| 8,291,238 B2 | 10/2012 | Ginter et al. |
| 2002/0022472 A1 | 2/2002 | Watler et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0176377 A1 | 11/2002 | Hamilton |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0088671 A1 | 5/2003 | Kinker et al. |
| 2003/0133408 A1 | 7/2003 | Cheng et al. |
| 2003/0161265 A1 | 8/2003 | Cao et al. |
| 2003/0182420 A1 | 9/2003 | Jones et al. |
| 2003/0182435 A1 | 9/2003 | Redlich et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah et al. |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0198331 A1 | 10/2004 | Coward et al. |
| 2004/0236547 A1 | 11/2004 | Rappaport et al. |
| 2004/0249918 A1 | 12/2004 | Sunshine |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0060266 A1 | 3/2005 | DeMello et al. |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0072646 A1 | 4/2006 | Feher et al. |
| 2006/0085543 A1 | 4/2006 | Hrastar et al. |
| 2006/0112016 A1 | 5/2006 | Ishibashi |
| 2006/0143098 A1 | 6/2006 | Lazaridis |
| 2006/0165060 A1 | 7/2006 | Dua |
| 2006/0178918 A1 | 8/2006 | Mikurak |
| 2006/0183462 A1 | 8/2006 | Kolehmainen et al. |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0291477 A1 | 12/2006 | Croak et al. |
| 2007/0019670 A1 | 1/2007 | Falardeau |
| 2007/0022289 A1 | 1/2007 | Alt et al. |
| 2007/0036312 A1 | 2/2007 | Cai et al. |
| 2007/0055694 A1 | 3/2007 | Ruge et al. |
| 2007/0061243 A1 | 3/2007 | Ramer et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0130315 A1 | 6/2007 | Friend et al. |
| 2007/0140113 A1 | 6/2007 | Gemelos |
| 2007/0140275 A1 | 6/2007 | Bowman et al. |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259673 A1 | 11/2007 | Willars et al. |
| 2007/0263558 A1 | 11/2007 | Salomone |
| 2007/0274327 A1 | 11/2007 | Kaarela et al. |
| 2007/0282896 A1 | 12/2007 | Wydroug et al. |

| | | |
|---|---|---|
| 2007/0294395 A1 | 12/2007 | Strub et al. |
| 2007/0298764 A1 | 12/2007 | Clayton |
| 2008/0005285 A1 | 1/2008 | Robinson et al. |
| 2008/0005561 A1 | 1/2008 | Brown et al. |
| 2008/0010452 A1 | 1/2008 | Holtzman et al. |
| 2008/0039102 A1 | 2/2008 | Sewall et al. |
| 2008/0049630 A1 | 2/2008 | Kozisek et al. |
| 2008/0052387 A1 | 2/2008 | Heinz et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0256593 A1 | 10/2008 | Vinberg et al. |
| 2008/0262798 A1 | 10/2008 | Kim et al. |
| 2008/0268813 A1 | 10/2008 | Maes |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0316923 A1 | 12/2008 | Fedders et al. |
| 2008/0318547 A1 | 12/2008 | Ballou et al. |
| 2008/0318550 A1 | 12/2008 | Deatley |
| 2008/0319879 A1 | 12/2008 | Carroll et al. |
| 2009/0005005 A1 | 1/2009 | Forstall et al. |
| 2009/0013157 A1 | 1/2009 | Beaule |
| 2009/0046723 A1 | 2/2009 | Rahman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0307746 A1* | 12/2009 | Di et al. |
| 2009/0315735 A1 | 12/2009 | Bhavani et al. |
| 2010/0017506 A1 | 1/2010 | Fadell |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0082431 A1 | 4/2010 | Ramer et al. |
| 2010/0103820 A1 | 4/2010 | Fuller et al. |
| 2010/0144310 A1 | 6/2010 | Bedingfield, Sr. et al. |
| 2010/0153781 A1 | 6/2010 | Hanna |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0325420 A1 | 12/2010 | Kanekar |
| 2011/0126141 A1 | 5/2011 | King et al. |

FOREIGN PATENT DOCUMENTS

| | | |
|---|---|---|
| EP | 1772988 A1 | 4/2007 |
| EP | 1978772 A1 | 10/2008 |
| WO | WO 99/65185 | 12/1999 |
| WO | WO99/065185 A2 | 12/1999 |
| WO | WO 03/014891 | 2/2003 |
| WO | WO 03/058880 | 4/2003 |
| WO | WO 2004/028070 | 4/2004 |
| WO | WO 2004/077797 | 9/2004 |
| WO | WO 2004/095753 | 11/2004 |
| WO | WO 2006/004467 | 1/2006 |
| WO | WO 2006/050758 | 5/2006 |
| WO | WO 2006/073837 | 7/2006 |
| WO | WO 2006/077481 | 7/2006 |
| WO | WO 2007/018363 | 8/2006 |
| WO | WO 2006/130960 | 12/2006 |
| WO | WO 2007/001833 | 1/2007 |
| WO | WO 2007/014630 | 2/2007 |
| WO | WO 2007/053848 | 5/2007 |
| WO | WO 2007/069245 | 6/2007 |
| WO | WO 2007/107701 | 9/2007 |
| WO | WO 2008/017837 | 2/2008 |
| WO | WO 2008/051379 | 5/2008 |
| WO | WO 2008/066419 | 6/2008 |
| WO | WO 2008/080139 | 7/2008 |
| WO | WO 2008/080430 | 7/2008 |
| WO | WO 2008/099802 | 8/2008 |
| WO | 2010088413 | 8/2010 |

OTHER PUBLICATIONS

Koutsopoulou et al., Middleware Platform for the Support of Charging Reconfiguration Actions, 2005.

Nilsson et al., A Novel MAC Scheme for Solving the QoS Parameter Adjustment Problem in IEEE802.11e EDCA, Feb. 2006.

Author Unknown, Overview of GSM, GPRS, and UMTS, Chapter 2, Nov. 4, 2008.

Chaouchi et al., Policy Based Networking in the Integration Effort of 4G Networks and Services, 2004 IEEE.

Zhu et al., A Survey of Quality of Service in IEEE 802.11 Networks, IEEE Wireless Communications, Aug. 2004.

Kyriakakos et al., Ubiquitous Service Provision in Next Generation Mobile Networks, Proceedings of the 13th IST Mobile and Wireless Communications Summit, Lyon, France, Jun. 2004.

Farooq et al., An IEEE 802.16 WiMax Module for the NS-3 Simulator, Mar. 2-6, 2009.

Author Unknown, HP, IP Multimedia Services Charging, A White Paper from HP, Jan. 2006.

Author Unknown, Kindle™ User's Guide 3$^{rd}$ Edition, Copyright 2004-2009.

International Search Report and Written Opinion mailed Mar. 16, 2010 from International Serial No. PCT/US2010/022235 filed Jan. 27, 2010.

Hartmann et al., Agent-Based Banking Transactions & Information Retrieval-What about Performance Issues? 1999.

Van Eijk, et al., GigaMobile, Agent Technology for Designing Personalized Mobile Service Brokerage, Jul. 1, 2002.

Yu Li, Dedicated E-Reading Devices: The State of the Art and Challenges, Scroll, vol. 1, No. 1, 2008.

Dikaiakos et al., A Distributed Middleware Infrastructure for Personalized Services, Nov. 24, 2003.

Rao et al., Evolution of Mobile Location-Based Services, Communication of the ACM, Dec. 2003.

Chandrasekhar et al., Femtocell Networks: A Survey, Jun. 28, 2008.

Hossain et al., Gain-Based Selection of Ambient Media Services in Pervasive Environments, 2008.

Author Unknown, 3GPP TS 23.203, V8.4.0, $3^{rd}$ Generation Partnership Project; Technical Specification Group Services and System Aspects; Policy and Charging Control Architecture (Release 8), Dec. 2008.

Author Unknown, 3GPP TS 23.401, V8.4.0, $3^{rd}$ Generation Partnership Project; Technical Specification Group Services and System Aspects; General Packer Radio Service (GPRS) Enhancements for Evolved Universal Terrestrial Radio Access Network (E-UTRAN) Access (Release 8), Dec. 2008.

Stephan Steglich, I-Centric User Interaction, Nov. 21, 2003.

Han et al., Information Collection Services for Qos-Aware Mobile Applications, 2005.

Alonistioti et al., Intelligent Architectures Enabling Flexible Service Provision and Adaptability, 2002.

Rolf Oppliger, Internet Security: Firewalls and Bey, Communications of the ACM, May 1997, vol. 40. No. 5.

Author Unknown, "Data Roaming Tariffs—Transparency Measures." EUROPA—Europe's Information Society Thematic Portal website, date unknown.

* cited by examiner

SECURITY TECHNIQUES FOR DEVICE ASSISTED SERVICES

CROSS REFERENCE TO OTHER APPLICATIONS

This application claims priority to U.S. Provisional Patent Application No. 61/206,354 entitled SERVICES POLICY COMMUNICATION SYSTEM AND METHOD filed Jan. 28, 2009, U.S. Provisional Patent Application No. 61/206,944 entitled SERVICES POLICY COMMUNICATION SYSTEM AND METHOD filed Feb. 4, 2009, U.S. Provisional Application No. 61/207,393 entitled SERVICES POLICY COMMUNICATION SYSTEM AND METHOD filed Feb. 10, 2009, U.S. Provisional Patent Application No. 61/207,739 entitled SERVICES POLICY COMMUNICATION SYSTEM AND METHOD filed on Feb. 13, 2009, and U.S. Provisional Patent Application No. 61/252,151 entitled SECURITY TECHNIQUES FOR DEVICE ASSISTED SERVICES, filed on Oct. 15, 2009, which are incorporated herein by reference for all purposes.

This application is a continuation in part of co-pending U.S. patent application Ser. No. 12/380,780, entitled AUTOMATED DEVICE PROVISIONING AND ACTIVATION, filed on Mar. 2, 2009, which is incorporated herein by reference for all purposes, and which claims priority to U.S. Provisional Patent Application No. 61/206,354 entitled SERVICES POLICY COMMUNICATION SYSTEM AND METHOD filed Jan. 28, 2009, U.S. Provisional Patent Application No. 61/206,944 entitled SERVICES POLICY COMMUNICATION SYSTEM AND METHOD filed Feb. 4, 2009, U.S. Provisional Application No. 61/207,393 entitled SERVICES POLICY COMMUNICATION SYSTEM AND METHOD filed Feb. 10, 2009, and U.S. Provisional Patent Application No. 61/207,739 entitled SERVICES POLICY COMMUNICATION SYSTEM AND METHOD filed on Feb. 13, 2009, which are incorporated herein by reference for all purposes.

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
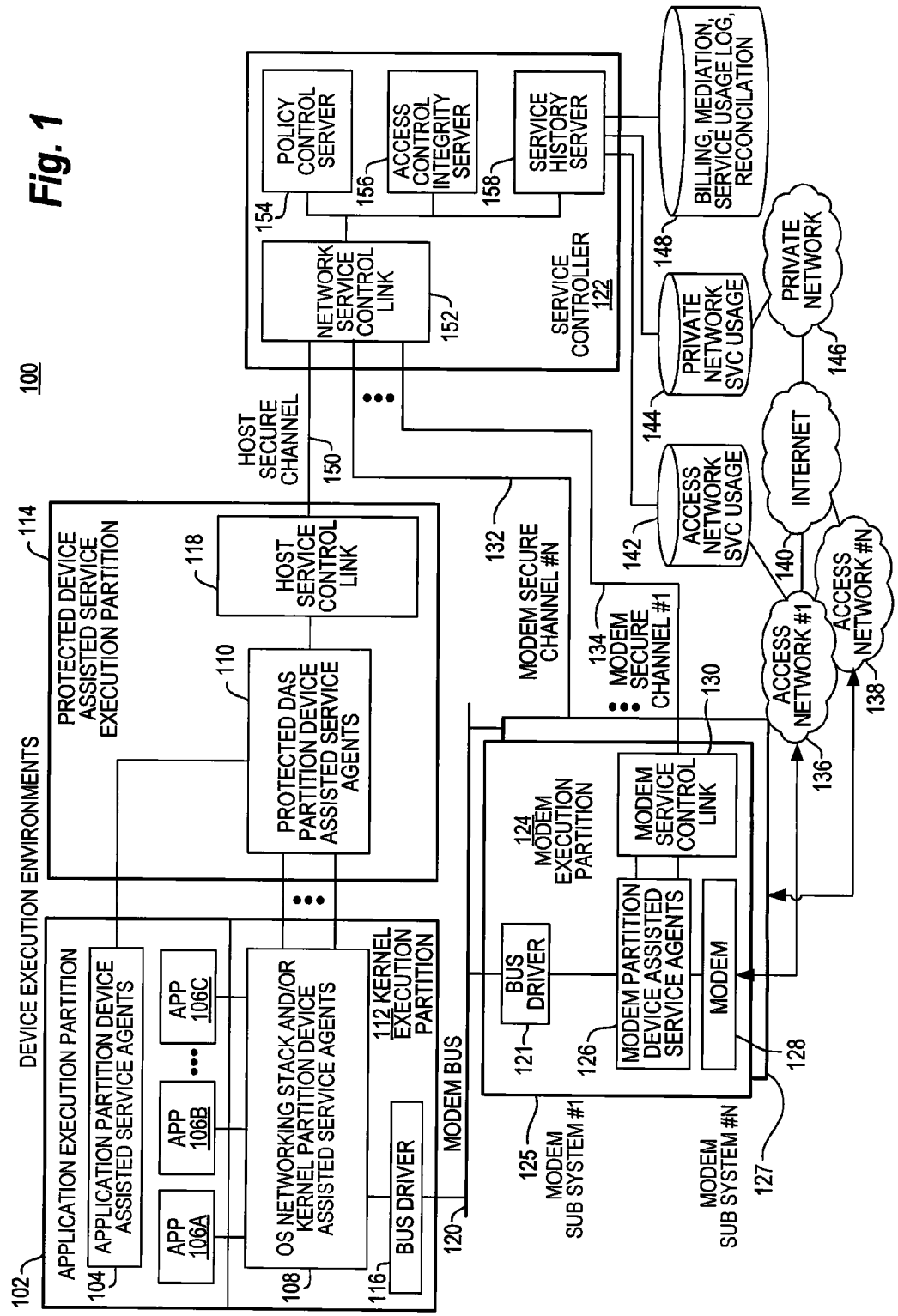
FIG. 1 illustrates a secure execution environment for device assisted services in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, security techniques for device assisted services are provided. In some embodiments, secure service measurement and/or control execution partition techniques for device assisted services are provided. In some embodiments, a secure execution environment for device assisted services is provided. In some embodiments, a secure stack for device assisted services is provided. In some embodiments, a secure memory for device assisted services is provided. In some embodiments, a secure modem for device assisted services is provided (e.g., providing a secure communication link between the modem/modem driver and a service processor and/or agent on the device, such as a communications device or an intermediate networking device). In some embodiments, one or more secure monitoring points for device assisted services are provided. In some embodiments, one or more secure monitoring points with verification for device assisted services are provided (e.g., a secured monitoring point can be provided in a modem, which communicates securely to a secured execution environment in a CPU/processor, which can then verify such service usage measures). In some embodiments, a secure bus for device assisted services is provided. In some embodiments, a secure execution environment in the CPU/processor for device assisted services is provided. In some embodiments, secure access to a secure execution environment(s) for device assisted services is provided (e.g., securing communication from a bottom of the stack, such as modem drivers, which require credentials to access the bus as controlled by a service processor or secure agent on the device, and in which the traffic on the bus is encrypted). In some embodiments, various secure execution environments for device assisted services are provided using various hardware partition techniques (e.g., secure memory, secure modems, secure memory partition(s) in the CPU/processor), as described herein.

In some embodiments, device assisted services (DAS) provide for one or more of device based service usage measurements, service usage policy implementation, service usage accounting, service usage control, and any of the other functions described in various embodiments that assist, replace, and/or augment network based functions. For example, various DAS embodiments perform one or more of the following: facilitate and control activation to one or more access service networks; measure access and/or service usage on one or more access networks; control access and/or service usage on one or more access networks; account for different types of service usage on one or more access networks; implement quality of service (QOS) controls, collect and report QOS traffic demand, aggregate multiple device QOS demand reports to assess a measure of overall network QOS demand, and/or facilitate QOS resource allocation; and/or facilitate roaming between access networks. There are many more functions and embodiments for DAS as described with respect to various embodiments.

In some embodiments, various program/functional elements that perform the functions to implement various DAS embodiments are referred to herein as DAS agents or device assisted service agents, or in some embodiments, more specific terms are used to be more descriptive in specific examples. In some embodiments, device assisted service agent functions include service measurements and/or service measure recording and/or service measure reporting (e.g., to the service controller, the device, the user, or other device agents) and/or service measure synchronization (e.g., between device and network). In some embodiments, device assisted service agent functions include service usage controls and/or service usage control policy settings. In some embodiments, service usage controls include one or more of network authorization, network authentication, network admission, access control, service usage activity classification, allowing or disallowing one or more service usage activity and traffic shaping for one or more service usage activity.

In some embodiments, device assisted service agent functions include one or more of the following: reporting service usage to QOS control elements in the network, receiving QOS assignment from the network, reporting QOS assignments to the network, and/or communicating with QOS service reservation elements in the network. In some embodiments, device assisted service agent functions include one or more of implementing QOS service controls on the device based on one or more of the following criteria: fair queuing of service usage activities, differentiated QOS based on an assigned QOS hierarchy of service usage activities, service usage activity QOS assignments from the network for one or more service usage activities, service usage activity policy directives from the network for one or more service usage activities.

In some embodiments, a service control link is used for communication between the device assisted service agents and the service controller. In some embodiments, the service control link is a secure link (e.g., an encrypted communication link).

In some embodiments, the device assisted service agent functions include device assisted service system communication, measuring and/or recording and/or reporting and/or synchronizing service measures, observing communicating information for service control integrity, communicating information for service control policy instructions and/or settings, or updating device assisted software and/or agent settings.

In some embodiments, device assisted service on the device includes the following: service measurements, service controls, user interface and usage reporting, user policy options, accept policy instructions, protected execution partition provided to prevent hacking, malware, errors, and other security techniques. In some embodiments, device assisted service on the server includes one or more of the following: set policy, set configurations, install/update agents, check usage versus policy, check proper operation of agents, synchronize usage from network to device, and other verification techniques. For example, when errors in policy enforcement are detected, servers can perform actions to either further observe, quarantine, or suspend the device.

In some embodiments, a control server/control service network element receives service measures from the device. In some embodiments, the control server/control service network element receives service measures from the network. In some embodiments, the control server/control service network element sets policies and manages service across multiple networks (e.g., while one modem is shown in various figures, multiple modems can be employed for multiple networks with consistent service usage measures, service controls, QOS controls, UI (User Interface), user preferences, user usage reporting, and/or other settings/controls across different networks).

In some embodiments, traffic type refers to one or more of the following: best effort network traffic, real-time traffic (e.g., live voice such as VOIP, live video, etc.), streaming traffic, multi-cast traffic, uni-cast traffic, point to point traffic, file types, traffic associated with an application, real time traffic, traffic with an assigned priority, traffic without an assigned priority, and traffic for a certain network.

In some embodiments, service usage activity refers to a usage of service by a device. In some embodiments, service usage activity can be one or more of connection to an access network, connection to certain destinations, URLs or addresses on a network, connection to the network by one or more applications, transmission of certain types of traffic, a type of transaction based service, a type of advertising based services, or a combination of one or more of the following: an application type, a network destination/address/URL, a traffic type, and a transaction type.

In some embodiments, protection of the device assisted service agents/functional elements to protect the functions that perform the device assisted functions is provided with a protected execution partition on the CPU (Central Processor Unit), APU (Auxiliary Processor Unit), or another hardware based processor. For example, such hardware protected execution capabilities in the CPU, APU, or other processor can be combined in some embodiments with either OS software functions or other native mode software functions to create secure program execution partitions as described herein. In some embodiments, the term host is used to refer to the hardware and firmware and/or software system that executes the device applications and networking stack. In some embodiments, some of the device assisted service agents/functions are implemented in a modem execution partition environment.

FIG. 1 illustrates a secure execution environment 100 (e.g., for a communications device) for device assisted services in accordance with some embodiments. As shown in FIG. 1, the device execution environments include program/functional elements for a communications (e.g., a communications device can be an intermediate networking device, such as 3G/4G WWAN to WLAN bridges/routers/gateways, femto cells, DOCSIS modems, DSL modems, remote access/backup routers, and other intermediate network devices, or a mobile communications device, such as a mobile phone, a PDA, an eBook reader, a music device, an entertainment/gaming device, a computer, laptop, a netbook, a tablet, a home networking system, and/or any other mobile communications device) device that utilizes the modem subsystems #1 (125) through #N (127) to connect to one or more of the access networks #1 (136) through #N (138). In some embodiments, a communications device includes multiple program execution partitions. As shown in FIG. 1, four execution partitions are provided: an application execution partition 102 in which, for example, application programs execute, a kernel execution partition 112 in which, for example, the lower level drivers and basic low level OS programs execute, a protected device assisted service (DAS) execution partition 114 (also referred to as protected DAS partition) in which, in some embodiments, some or all of the device assisted service agents and/or functions execute, and a modem execution partition 124 in which, for example, the modem program elements execute and, in some embodiments, some or all of the device assisted service agents and/or functions execute. In some embodiments, each of these execution partitions are optimized for different software functions, each providing programs with the basic physical memory, data memory, CPU or APU or modem processor execution resources, high level and/or low level OS, memory management, file storage, I/O device resources (e.g., user interface (UI), peripherals, etc.), network communications stack, other device resources, and/or other resources that are required or used for operation of the programs. The collection of these hardware and software resources for the CPU or APU is sometimes referred to herein with the term host.

As shown, FIG. 1 illustrates an application execution partition 102 and a kernel execution partition 112, which are shown as separate partitions within the device execution environments. For example, this separation is based on the manner in which "kernel programs" (e.g., drivers and network stack, etc.) are commonly supported as compared to "application programs" (e.g., browsers, word processors, user interfaces, etc.) within the context of several different popular operating systems (OS) (e.g., Windows, UNIX, Linux, MAC OS, certain mobile device OSs, certain embedded device OSs, etc.). In some embodiments, this functional separation is not required, and, in some embodiments, other functional separations are supported.

As shown in FIG. 1, protected device assisted service agents, such as the protected DAS partition device assisted service agents 110, execute in the protected DAS partition 114 while unprotected device assisted service agents and/or OS networking stack elements and applications (e.g., applications 106A through 106C) execute outside of the secure device assisted service execution partition 114, such as the application partition device assisted service agents 104 and the OS networking stack and/or kernel partition device assisted service agents 108. For example, the protected DAS partition 114 can make it more difficult for a hacker, malware or system errors to compromise, attack or modify the device assisted service measurements, service policy implementation or service usage control operations on the device (e.g., communications device). In some embodiments, the protected DAS partition 114 need not support open access to all programs and OS elements so that it can be easier to protect. Also, as shown, a bus driver 116 in the application execution partition 102 provides for communication with a modem bus 120, which is in communication with a bus driver 121 in the modem execution partition 124. The protected DAS partition also includes a host service control link 118, which facilitates communication with a host secure channel 150 as shown.

In some embodiments, the protected DAS partition 114 is a protected execution partition on the main device that is supported by certain configurations in the host (e.g., a secure virtual execution environment or a separate hardware security function). For example, this protected execution partition can be used to provide added service measurement integrity and/or service control integrity for a device assisted service enabled device. In some embodiments, as described herein, the operating system (OS) also performs a role in establishing the protected execution partition for secure operation of device assisted services, and, in some embodiments, this role is performed by native software or firmware operating on secure hardware elements.

In some embodiments, the DAS agents responsible for maintaining service control integrity execute in the protected DAS partition 114. For example, the protected DAS partition device assisted service agents 110 can include one or more of the following: one or more service usage measurement functions; some or all of the device networking stack functions that are monitored and/or controlled by the device assisted services system; device drivers that interface to an OS networking stack to observe or manipulate stack traffic; access control integrity functions; service policy control functions; service UI functions; application identification functions, and/or functions to classify service usage activities by combinations of application, address/URL and/or traffic type; modem bus driver functions; and/or modem data encryption functions to prevent other unauthorized programs from bypassing the device assisted service measurements and/or controls by directly accessing the modem around the stack. In some embodiments, the system designer or a given set of design criteria determine which of the various described device assisted agent functions should be executed in protected DAS partition 114 to strengthen the service control integrity for the system.

In some embodiments, the device operating system provides for the protected DAS partition 114 in addition to conventional security features available in the operating system. In some embodiments, the protected DAS partition 114 provides an execution partition with increased program execution protection in which, for example, service measurement and/or service control programs (agents) can execute in a mode that provides for higher access control integrity (e.g., proper service usage reporting and/or service measurement and/or service control system operation with increased protection from attacks, errors, malware, etc.). In some embodiments, a hardware assisted secure execution partition provides for increased program execution protection for device assisted service agent functions.

In some embodiments, a service control link (e.g., host service control link 118 via host secure channel 150 to network service control link 152) is used for communication between the device assisted service agents and a service controller 122. In some embodiments, the service control link is a secure link (e.g., an encrypted communications link). In some embodiments, an encrypted secure control link can be implemented over the higher layers of the network stack (e.g., TCP, HTTP, TLS, etc.), and, in some embodiments, the encrypted link can be implemented over lower layers in the network stack, such as the IP layer or the access network layers (e.g., the WWAN device management channels or signaling layers). In some embodiments, service control link security is provided at least in part by encrypting link traffic between the device and the service controller 122. In some embodiments, service control link security is provided at least in part by running the service control link device side program agents in the protected DAS partition 114. In some embodiments, service control link security is achieved at least in part by restricting access to the service control link to certain device assisted service agents that are allowed to communicate with the service controller 122. In some embodiments, the agents that are allowed to communicate with the service control link perform such communications using encrypted communications. In some embodiments, the encrypted communications is accomplished with a secure inter-agent communication bus on the device. In some embodiments, the only mechanism for modifying the configuration of the operation, execution code, execution instructions and/or settings of certain device assisted service processor agents executing in the protected DAS partition 114 is through the service control link. In some embodiments, the only mechanism for modifying any program elements executing inside the protected DAS partition 114 is through the service control link so that only the service controller 122 may modify the operation or service policy settings for the agents located in the service measurement and/or service control execution partition.

As shown in FIG. 1, various server functions within the service controller 122 are provided. In some embodiments, a service history server 158 collects service usage measures from one or more of the device DAS agents and/or from various sources of potential network based service usage databases, such as the access network service usage 142 (e.g., carrier charging data record (CDR) systems), private network service usage 144 (e.g., MVNO or enterprise network service usage accounting system), and/or billing, mediation service usage log, reconciliation 148 (e.g., service provider billing or mediation system). In some embodiments, an access control integrity server 156 is used to compare various access control verification checks to ensure that the device assisted service agents have not been compromised. The various embodiments used in the access control integrity server 156 to perform these integrity checks are described with respect to various embodiments. Some embodiments include comparing device based service usage measures versus the service usage that should result if the desired service policy were properly implemented, comparing device based service usage measures versus the service usage that should result if the desired service policy were properly implemented with device based service usage measures that are executing in the protected DAS partition 114 and/or the modem execution partition 124, comparing network based service usage measures versus the service usage that should result if the desired service policy were properly implemented, and comparing network based service usage measures with device based service usage measures. In some embodiments, a policy control server 154 stores policy settings for the various service plans that can be implemented on the device, and communicates the appropriate policy settings to the appropriate device DAS agents.

In some embodiments, the service controller 122 has secure access to service measures, service control settings, software images, software security state(s), and/or other settings/functions, for example, by virtue of the hardware enhanced execution partition and the secure channel into the protected DAS partition 114. For example, the host secure channel 150 can be encrypted employing keys that are public/private or point to point private. Also, other link security, for example, can be implemented as described herein. For example, servers can ensure that the link remains authenticated and information is validated. For example, the service controller can perform one or more of the following verification techniques: compare the monitored service usage versus the policy, compare the monitored service usage versus other service usage measures and/or combined with various other network service usage measures.

In some embodiments, the protected DAS partition 114 includes a host service control link 118 as shown in FIG. 1 that works in combination, that is, in communication with a network service control link 152 to send and receive secure messages between the service controller and the host via a host secure channel 150. In some embodiments, the protected DAS partition 114 only accepts new program images from the service controller 122 and not from local programs or disks. In some embodiments, the protected DAS partition 114 cannot communicate with other applications and/or kernel programs. In some embodiments, the protected DAS partition 114 can also communicate with other applications and/or kernel programs but only to gather information or to set settings. In some embodiments, the protected DAS partition 114 can also communicate with other applications and/or kernel programs but only through a restricted encrypted communication bus that restricts outside program access to protected programs or agent functions, and can also restrict the agents inside of the protected partition from accepting unauthorized information or code modifications from programs outside the protected partition. Various other security techniques can be provided for the DAS execution environments as will be apparent to one of ordinary skill in the art in view of the embodiments described herein.

In some embodiments, the protected DAS partition 114 is created by employing CPU or APU hardware security features in addition to or in alternative to other software security features (e.g., virtual execution partitions) that can be provided by the operating system and/or other software. In some embodiments, the host hardware security features are provided with the operating system secure kernel operating modes. In some embodiments, the host hardware security features used for secure device assisted service execution partition operation are independent of the operating system kernel (e.g., implemented in secure program partitions in a separate secure program area not directly controlled by the OS and/or software that does not have access to the partitions).

In some embodiments, the hardware security features that support the protected DAS partition 114 include preventing other elements on the device from writing and/or reading certain memory areas reserved for device assisted service agents and/or control link functions. In some embodiments, this memory protection function is accomplished by locating the memory in a secure hardware partition that cannot be accessed by unauthorized device program elements (e.g., a separate bank of isolated memory space within the host CPU). In some embodiments, this memory protection function includes encrypting traffic to and from memory so that only authorized device program elements posses the counterpart encryption capability to access the memory. In some embodiments, the mechanism to access device assisted service agent memory and/or certain data elements is restricted to authorized device assisted service agents and/or the service controller via the service control link so that unauthorized program elements on the device cannot alter the device assisted service agent code and/or operation.

In some embodiments, the hardware security features that support the protected DAS partition 114 includes preventing unauthorized elements on the device from accessing the protected storage and/or file storage (e.g., "protected storage," such as disk storage, non-volatile memory, embedded non-volatile memory, such as NVRAM, flash or NVROM, securely embedded non-volatile memory, and/or other types of storage) that is used to store the device assisted service agent programs. In some embodiments, this protected storage is maintained within the secure hardware partitions that also execute one or more of the device assisted service agents so that only authorized device assisted service agents have access to the storage locations. In some embodiments, the images that are stored in such protected file storage must be properly encrypted and signed for a boot loader to authorize loading the device assisted service agent programs into execution memory, and in some embodiments, if the images are not properly signed then an access control integrity error is generated and/or the program is not loaded. In some embodiments, such properly signed DAS images can only be obtained from the service controller. In some embodiments, such DAS images can only be loaded into protected file storage by the service controller. In some embodiments, the hardware security features that prevent unauthorized elements on the device from accessing the protected file storage include encrypting all traffic to and from the secure storage so that only authorized device program elements possess the counterpart encryption capability to access the storage. In some embodiments, access or access rights to re-program a device assisted service agent program store is restricted to the service controller via the service control link so that unauthorized program elements on the device are not authorized to alter the device assisted service agent code and/or operation.

In some embodiments, the hardware security features that protect device assisted service agent storage include a protected DAS partition in which an access control integrity agent function is isolated from other device program elements, and a secure service control link is also isolated in a similar manner, and the access control integrity agent scans the execution memory, data memory and/or file storage used by one or more device assisted services agents to measure and/or control services. In some embodiments, the purpose of the scan is to detect changes to the device assisted service agent code and/or data. In some embodiments, the purpose of the scan is to detect other unauthorized program elements or data that may be present in reserved or protected areas used for device assisted service agent execution. In some embodiments, reports of such scan audits are reported over the service control link to the service controller for further processing by use of cloud based resources to identify access control integrity violations. In some embodiments, the access control integrity agent functions include one or more of hashing other device assisted security agents, querying other device assisted security agents, observing the operation of other device assisted security agents or monitoring service measures and then either evaluating the results locally on the device to determine if they are within pre-defined allowable parameters or sending at least some of the results to the service controller for further analysis via the service control link. In some embodiments, the scan audits are compared with earlier versions of the scans to compare code configuration or operational characteristics. In some embodiments, the scan audits are compared against known databases for the code or operational characteristics that should be present in the DAS agents.

In some embodiments, an access control integrity agent, or a new version of the access control integrity agent can be downloaded by the service controller over the secure service control link. For example, this technique provides for a real time assessment of device service control security state as described above in the event that corruption or compromise of the secure device assisted service agent(s) has occurred. In some embodiments, the access control integrity agent that is downloaded can have a different configuration and/or operation than any agent previously loaded onto the device so that it is difficult or impossible for a hacker or malware to spoof the operation of the agent in a short period of time. For example, by requiring the agent to report security assessments back to the server in a period of time that is typically less than what is required to spoof the agent, the agent will either report back an accurate assessment of device status or will be blocked by a hacker or malware, and both of these conditions can provide the information required to take action if the device assisted services system has been corrupted or compromised.

In some embodiments, the protected DAS partition and/or the modem execution partition can be used to securely store some or all of the device credentials that are used for one or more of device group association, activation, authorization to the access network and/or the DAS network, service level, and service usage accounting and/or billing.

In some embodiments, the modem subsystem also includes DAS elements that strengthen the access control integrity of the DAS system. As shown in FIG. 1, one or more modems can include, in some embodiments, DAS agent functions labeled modem partition DAS agents 126. The modem execution partition 124 of the modem sub system #1 (125) of the modem execution partition 124 includes modem partition DAS agents 126 in communication (e.g., secure communication, such as using encrypted communications) with a modem 128 and a modem service control link 130, which is in communication with the network service control link 152 via the modem secure channel #1 (132), as shown. Also, the modem 128 is in communication (e.g., secure communication, such as using encrypted communications) with the access network #1 (136), which is in communication with the access network service usage 142 and the Internet 140, which is in communication with a private network 146, which is in communication with the private network service usage 144, as shown.

Example embodiments for DAS agent functions that execute in the modem execution partition include modem encryption and modem service usage measures. In other embodiments, the modem execution partition can also include higher level DAS agent functions, such as stack traffic classification, stack manipulation, access control, and/or traffic control. For example, the modem execution partition can also include a full service processor that is fully capable of managing all aspects of service usage measurement and/or service control. It will now be apparent to one of ordinary skill in the art that the modem execution partition can employ a number of the service security embodiments described in the context of the protected DAS partition, for example, to enhance the service integrity of the DAS system. For example, the DAS agents on the modem can be stored in an encrypted and signed format on non-volatile (NV) memory on the modem that is only accessible by the network service control link or by a local secure control link from the protected DAS partition to the modem execution partition. As shown in FIG. 1, a separate secure modem control channel (e.g., modem secure channel #1 (132) through modem secure channel #N (134)) that is distinct from the host secure control channel 150 is provided. This separate modem control channel can either be implemented over the higher network layers of the device or over the lower access network layer so that special access to access network resources is required to even connect to the modem DAS agents 126 thereby further enhancing service control related security.

In some embodiments, the protected DAS partition provides for performing the DAS agent functions required for parental controls, enterprise WWAN management controls or roaming controls, and/or usage reporting in the protected execution space. In view of the DAS embodiments described herein, it will now be apparent to one of ordinary skill in the art how to implement such protected controls for these various and other application scenarios.

In some embodiments, a protected DAS partition provides for performing a virtual machine (VM) on top of a secure machine. The device application OS that is accessible by software that can be installed without special permissions can be isolated from the secure hardware and/or OS that is running under the VM. Using these techniques, malware can be "cocooned in" on the VM OS rather than "walled out" as discussed with respect to various embodiments described herein.

In some embodiments, communication between program/functional elements outside of the protected DAS partition to DAS agents inside the protected DAS partition is controlled by a secure encrypted channel. In some embodiments, only programs/functions that have access to communicate with DAS agents are allowed to do so, and, in some embodiments, even these outside programs are not allowed to modify the DAS agent configuration, only to report information and/or receive information.

For example, various embodiments can be used to connect to multiple access networks through multiple modems, with each modem potentially being associated with a different set of DAS service policies corresponding to the different types of access networks supported. In some embodiments, such as for 3G/4G modems, WWAN/WLAN modems, and various other multiple modem embodiments, the multiple modems can also be provided on the same multi-mode modem subsystem rather than on different modem subsystems.

In some embodiments, the various techniques and embodiments described herein can be readily applied to intermediate networking devices as will now be apparent to one of ordinary skill in the art. For example, an intermediate networking device can includes some or all of the DAS agents for managing, controlling, and/or measuring service usage for one or more devices in communication with a wireless network via the intermediate networking device, in which the DAS agents can be executed in secure execution environments or secure execution partitions using the various techniques described herein. In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femto cells, back up cards for wired access routers, and other forms/types of intermediate networking devices.

Figure 2:
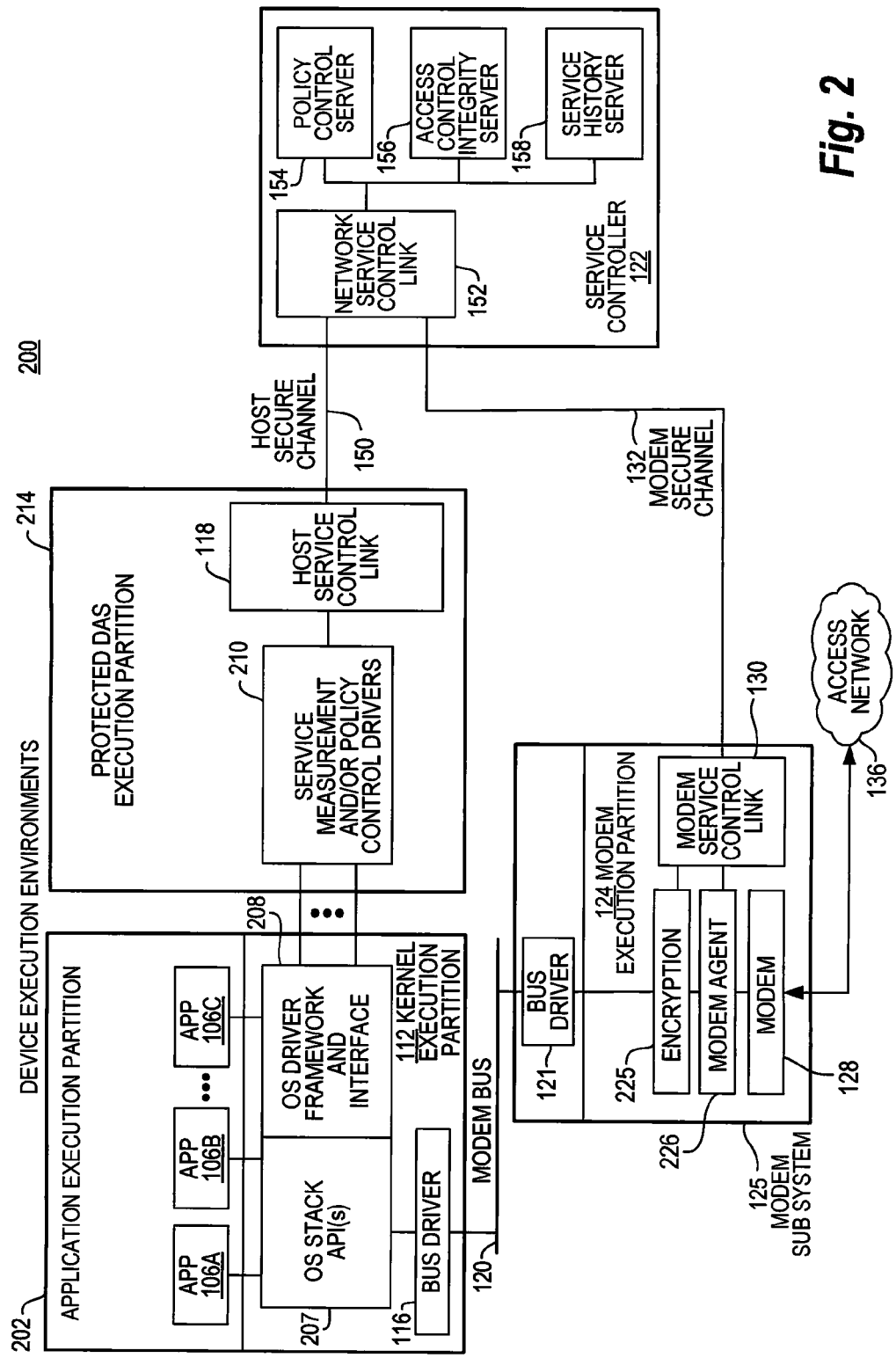
FIG. 2 illustrates another secure execution environment for device assisted services in accordance with some embodiments.

FIG. 2 illustrates another secure execution environment 200 for device assisted services in accordance with some embodiments. In particular, FIG. 2 illustrates an embodiment in which DAS agents do not actually replace the OS network stack elements, but instead one or more DAS agents include device driver programs that interface into the network stack and pass (e.g., securely communicate) traffic information or actual traffic back and forth with the stack. These device driver interface constructs are labeled OS driver framework and interface 208 as shown in FIG. 2. Example OS system constructs that provide for this type of architecture for DAS agents include Windows NDIS and/or TDI drivers, Windows Filter Platform (WFP), Berkeley Packet Filter, ipfw (e.g., a BSD packet filter that can be used for various OSs, such as Unix, Linux, MAC OS), and/or other platforms/programs performing these or similar functions. While these OS stack options are not secure in themselves, if the drivers that interface with them are secured as illustrated in FIG. 2 by executing the drivers in the protected DAS partition 214, then higher overall access control integrity/security levels can be achieved.

As shown in FIG. 2, the service measurement and/or policy control drivers 210 executed in the protected DAS partition 214 represent the DAS drivers that interface to the OS stack device driver interface constructs labeled OS driver framework and interface 208 executed in the kernel execution partition 212, which are in communication with/interface with OS Stack API(s) 207. As also shown, applications, such as applications 106A through 106C execute in the application execution partition 202. In some embodiments, service access control integrity is further enhanced by placing additional measurement points outside of the network stack, so that, for example, if the network stack service usage reporting is hacked, corrupted, and/or compromised, there is a secure additional or back-up service measure located on the device and/or in the network (e.g., modem agent 226 as shown in Figure, which provides a service measurement point in the modem for measuring service usage by the device, and as shown also provides for secure communication with the modem agent 226 using modem encryption 225). For example, the service measure provided by the modem agent 226, modem encryption 225, and/or modem bus 120 functions shown in FIG. 2 can be executed in a protected partition (e.g., modem execution partition 124 as shown in FIG. 2 can be implemented as a secure or protected partition using the various techniques described herein).

Figure 3:
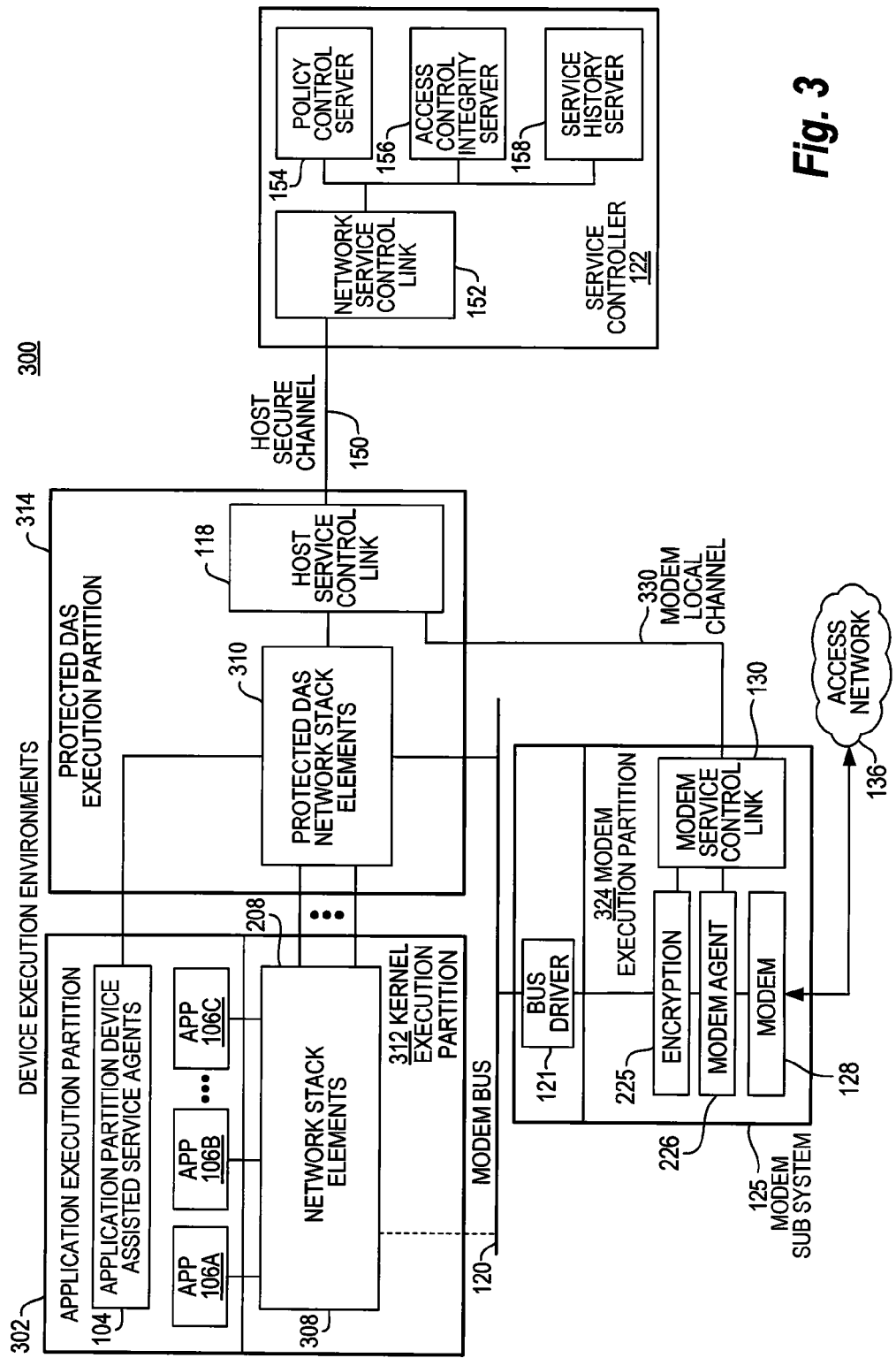
FIG. 3 illustrates another secure execution environment for device assisted services in accordance with some embodiments.

FIG. 3 illustrates another secure execution environment 300 for device assisted services in accordance with some embodiments. As shown, some stack elements are executed in the kernel execution partition 312 and some stack elements are executed in the protected DAS execution partition 314. In some embodiments, the DAS agents 104 executed in the application execution partition 302 are directly monitoring and/or controlling stack traffic by intercepting it and imposing additional traffic measurement and/or filtering. Examples of such techniques are described herein with respect to various embodiments. As shown in FIG. 3, the network stack elements 308 are the OS stack elements that reside in the kernel execution partition 312 and the protected DAS network stack elements 310 are the stack elements that reside in protected DAS execution partition 314. For example, as some or potentially all of the stack network traffic processing resides in the protected DAS execution partition 314, a high level of service control integrity can be maintained using these techniques. For example, the modem bus driver 121 can be executed in a secure execution partition, such as modem execution partition 324, which can be implemented as a secure execution partition using the various techniques described herein, or the modem bus driver 121 can be executed in the protected DAS execution partition 314, so that unauthorized programs can be blocked from accessing the access network through the modem.

In some embodiments, the entire stack is executed in the protected DAS execution partition 314 with only a stack API executing in kernel execution partition 312. Various other embodiments involve implementing a minimum (e.g., in terms of a number of agents and/or functionality) in the protected DAS execution partition 314 required to secure a service measure that can be used to confirm the integrity of the service policy implementation (e.g., as described with respect to various other embodiments disclosed herein). As will now be apparent to one of ordinary skill in the art, various combinations of stack processing functions can be implemented in a secure host execution partition to strengthen the service measurement and/or service control integrity of the DAS system using the techniques and/or similar techniques to the various techniques described herein.

In some embodiments, the stack elements implemented in the protected DAS execution partition can include stack API, sockets layer, TCP, UDP, service measurements at one or more points in the stack, IP layer processing, VPN/IPSEC, PPP, access control, traffic classification, traffic queuing, traffic routing, traffic QOS, traffic demand reporting to QOS allocation servers, traffic statistics reporting to the QOS servers, traffic QOS reservation requests including by traffic type or app type or service priority to the servers, traffic throttling, traffic statistics gathering, traffic QOS priority identification, modem drivers, modem data encryption, and/or other stack element functionality or features.

In some embodiments, the above discussed service control mechanisms are controlled by policy commands received over the service control link from the servers or other authorized network elements. In some embodiments, the device also reports usage measures to servers or other authorized network elements. In some embodiments, the device also reports QOS demand to the servers or other authorized network elements and/or accepts QOS instructions from the servers or other authorized network elements. In some embodiments, the device reports traffic statistics, projected traffic demand, application usage, projected QOS demand can all be reported to the servers or other authorized network elements for the purpose of provisioning the right amount of data bandwidth and traffic priority to the device, and the servers or other authorized network elements aggregate such reports from many different devices to project needed allocations across the entire network and make global bearer channel level or base station level decisions bearer channel allocation and bearer channel QOS allocation decisions, which can also be tied into a bearer channel provisioning, or bearer channel QOS provisioning apparatus or other authorized network elements located in the access network.

For example, as will now be apparent to one of ordinary skill in the art in view of the various embodiments described herein, additional security measures, can be added in some embodiments to augment the secure service partitioning, including, for example, access control integrity checks. For example, in addition to the service control policy instructions that can be received from the servers or other authorized network elements, an intermediate policy control agent can be present to make additional higher level decisions on how instantaneous policy should be implemented.

As shown in FIG. 3, the modem control link, shown as modem local channel 330, provides a link from local connection to the host service control link 118, which in turn connects through the host secure channel 150 to the service controller 152. This communication channel can also be implemented or configured to provide for encrypted communication and, in some embodiments, can be used as an alternative to the direct connection from the modem service control link to the network service control link as disclosed with respect to other figures and various embodiments as described herein.

As shown in FIG. 3, the final stack elements that feed or communicate with the modem bus driver 121 are the protected DAS network stack elements 310 located in the protected DAS execution partition 314 (illustrated as a solid line in FIG. 3), or, in some embodiments, can be the network stack elements 308 located in the kernel execution partition 312 (illustrated as a dashed line in FIG. 3). In some embodiments, these final stack elements feed or communicate with the modem subsystem 125. In some embodiments, the modem subsystem 125 includes an encrypted link so that the stack elements 310 in the protected DAS execution partition 314 can communicate with the modem 128 but other software programs or hardware elements cannot, for example, thereby preventing the service measures and/or controls from being inappropriately bypassed or otherwise comprised. For example and as similarly discussed above, the modem subsystem 125, for example, can include its own the protected execution partition using various techniques described herein. The modem protected execution partition, for example, can also include a service measure (e.g., modem agent 226 can provide such a service measurement point in the modem subsystem 125, as similarly described above with respect to FIG. 2) to increase service control integrity verification as depicted by service measure. The modem service measure can be included in protected execution partition that can only be accessed by the service controller 122 by way of the modem local channel 330, or the modem service measure can only be accessed by another DAS agent 310 in protected execution partition 314. In some embodiments, the modem local channel 330 is implemented as a secure channel (e.g., an encrypted communication channel between the modem service control link 130 and the host service control link 118). As described herein, the modem driver can reside in protected service execution environment, or the modem traffic can be encrypted within service execution environment. For example, the encryption settings can be controlled by various secure control servers.

Figure 4:
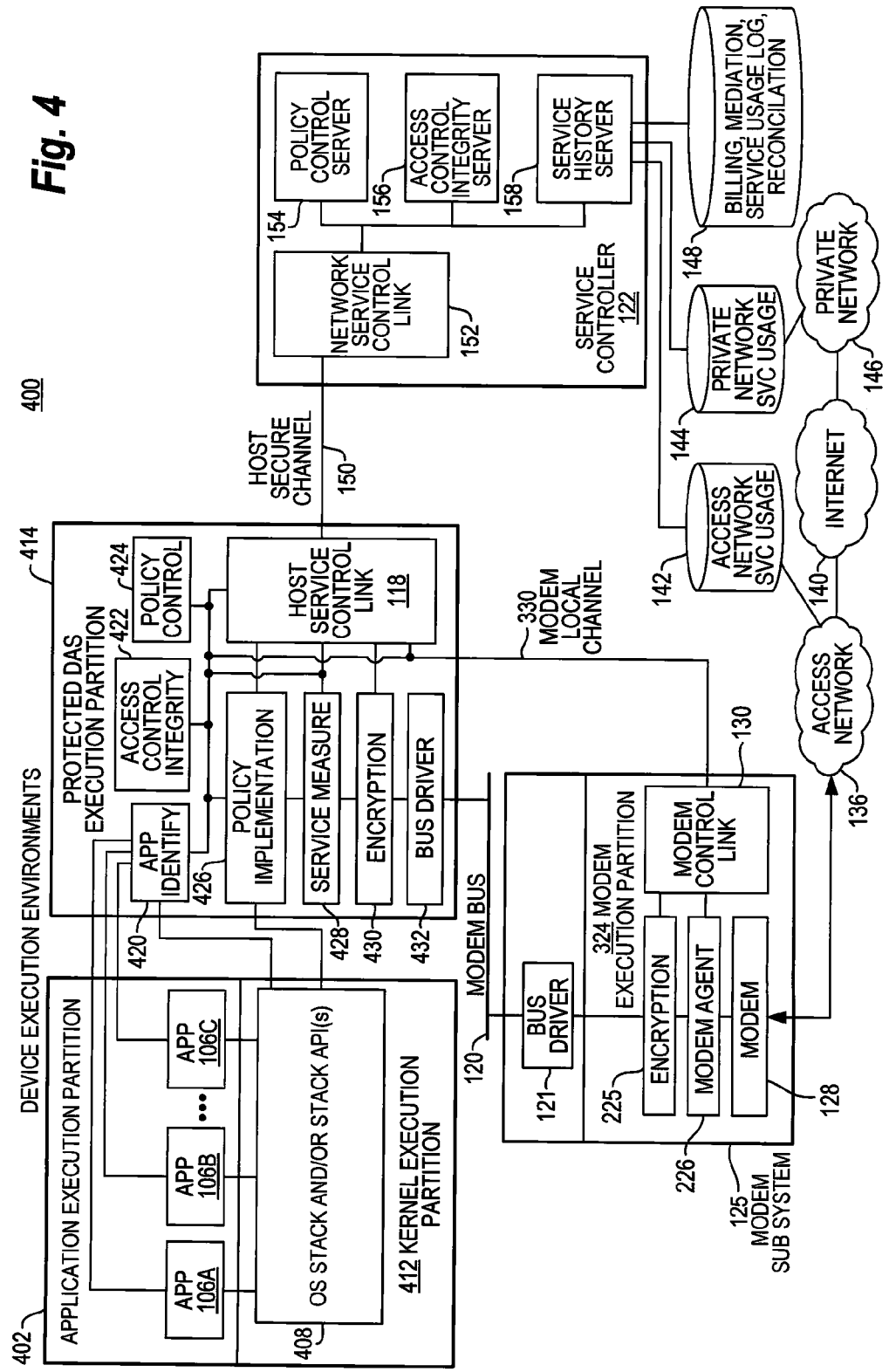
FIG. 4 illustrates another secure execution environment for device assisted services in accordance with some embodiments.

FIG. 4 illustrates another secure execution environment 400 for device assisted services in accordance with some embodiments. In particular, FIG. 4 illustrates a direct stack manipulation option performed by the DAS agents executed in the protected DAS execution partition 414, including, as shown, an app(lication) identify agent 420, an access control integrity agent 422, a policy control agent 424, a policy implementation agent 426, a service measure/service monitoring agent 428, a modem encryption agent 430, and a bus driver 432. For example, the policy implementation agent 426 performs access control and/or traffic shaping according a set of service control policies. The service control policies, for example, can be set by the service controller 122 or by the service controller 122 in coordination with the policy control agent 422. As shown the app identify agent 420 is in communication with the various applications 106A through 106C executed in the application execution partition 402. As also shown, the various applications 106A through 106C executed in the application execution partition 402 are in communication with the OS stack and/or stack API(s) 408 executed in the kernel execution partition 412.

In some embodiments, the protected service measure agent 428, the modem encryption agent 430, the modem driver agent 432, the application identifier agent 420, the access control integrity agent 422, and the policy control agent 424 are all implemented in protected DAS partition 414, as shown. In some embodiments, as will now be apparent to one of ordinary skill in the art, a subset of these functions can be implemented in a protected execution partition, such as the protected DAS partition, in various circumstances.

FIG. 4 also similarly shows various embodiments that are available for network based service usage measures and interfacing to the mediation and billing systems, and it should be understood that any or all of the embodiments and figures can be employed in the context of carrier networks, MVNOs, private networks, or open networks supporting enterprise IT manger controls, parental controls, multi-network controls, and/or roaming controls.

Figure 5:
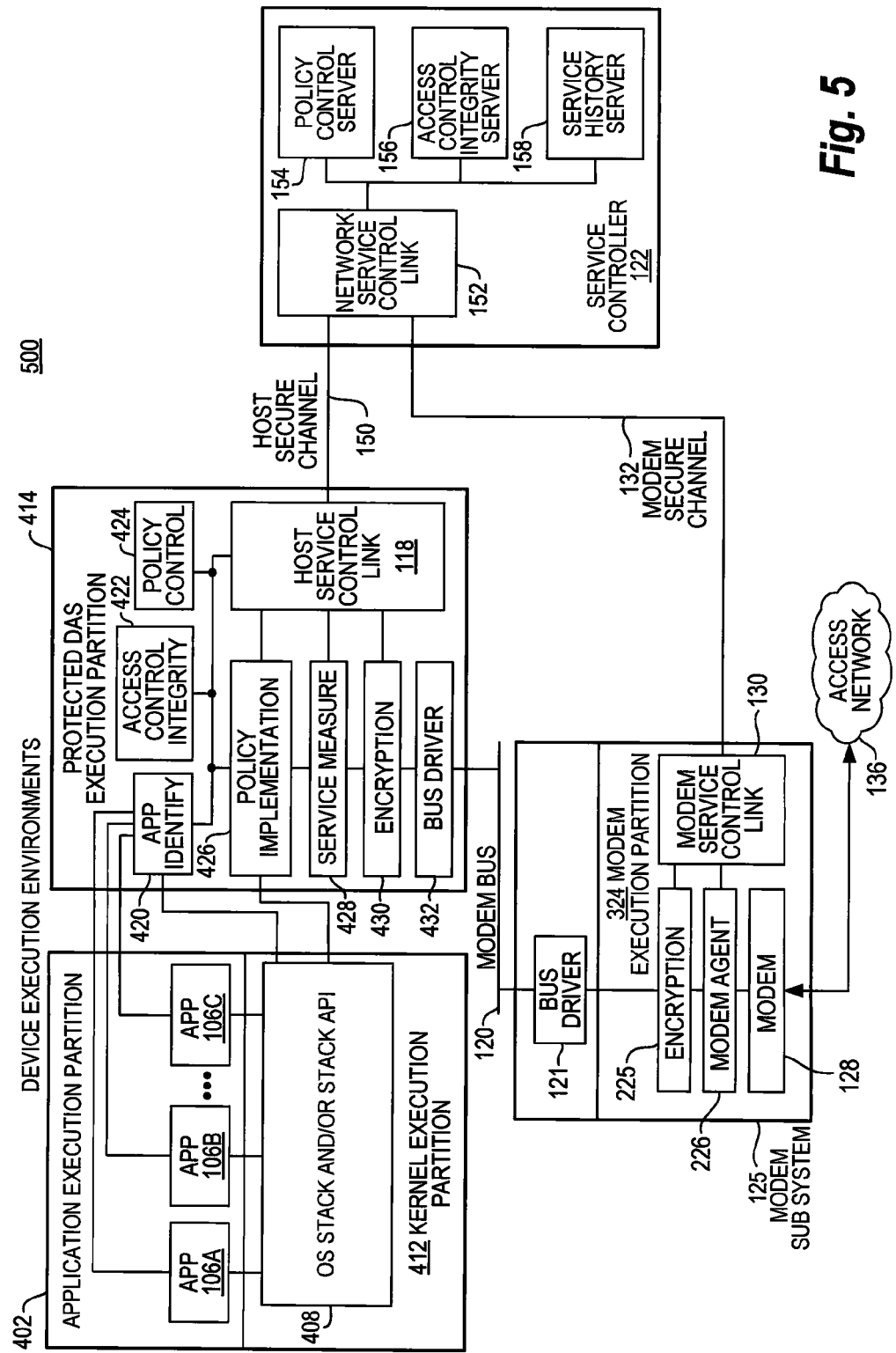
FIG. 5 illustrates another secure execution environment for device assisted services in accordance with some embodiments.

FIG. 5 illustrates another secure execution environment 500 for device assisted services in accordance with some embodiments. In particular, FIG. 5 is similar to that FIG. 4 except that FIG. 5 illustrates a modem service control link 132 that is connected directly to the service controller 122 via the network service control link 152 (e.g., via a modem secure channel). In some embodiments, a modem control link for DAS is established locally on the device or through an entirely different control channel, which, in some embodiments, provides enhanced security as discussed herein (e.g., it is very difficult to hack a service usage measure or service control that cannot be accessed on the device).

Figure 6:
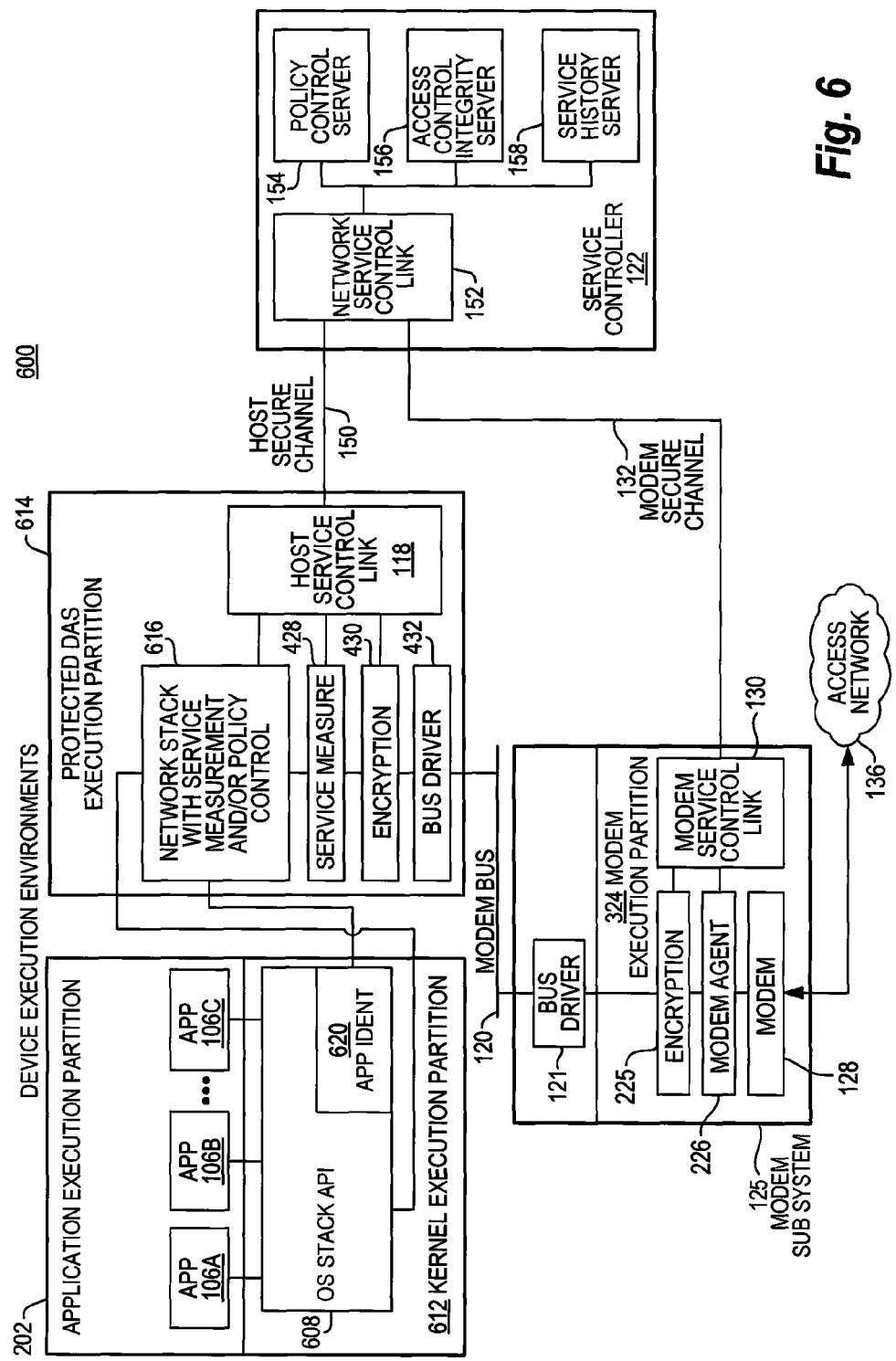
FIG. 6 illustrates another secure execution environment for device assisted services in accordance with some embodiments.

FIG. 6 illustrates another secure execution environment 600 for device assisted services in accordance with some embodiments. In particular, FIG. 6 illustrates a policy implementation agent 616 that includes the entire networking stack running in protected execution partition 614 and an OS stack API 608 that includes an application identifying function 620 in the kernel execution partition 612.

Figure 7:
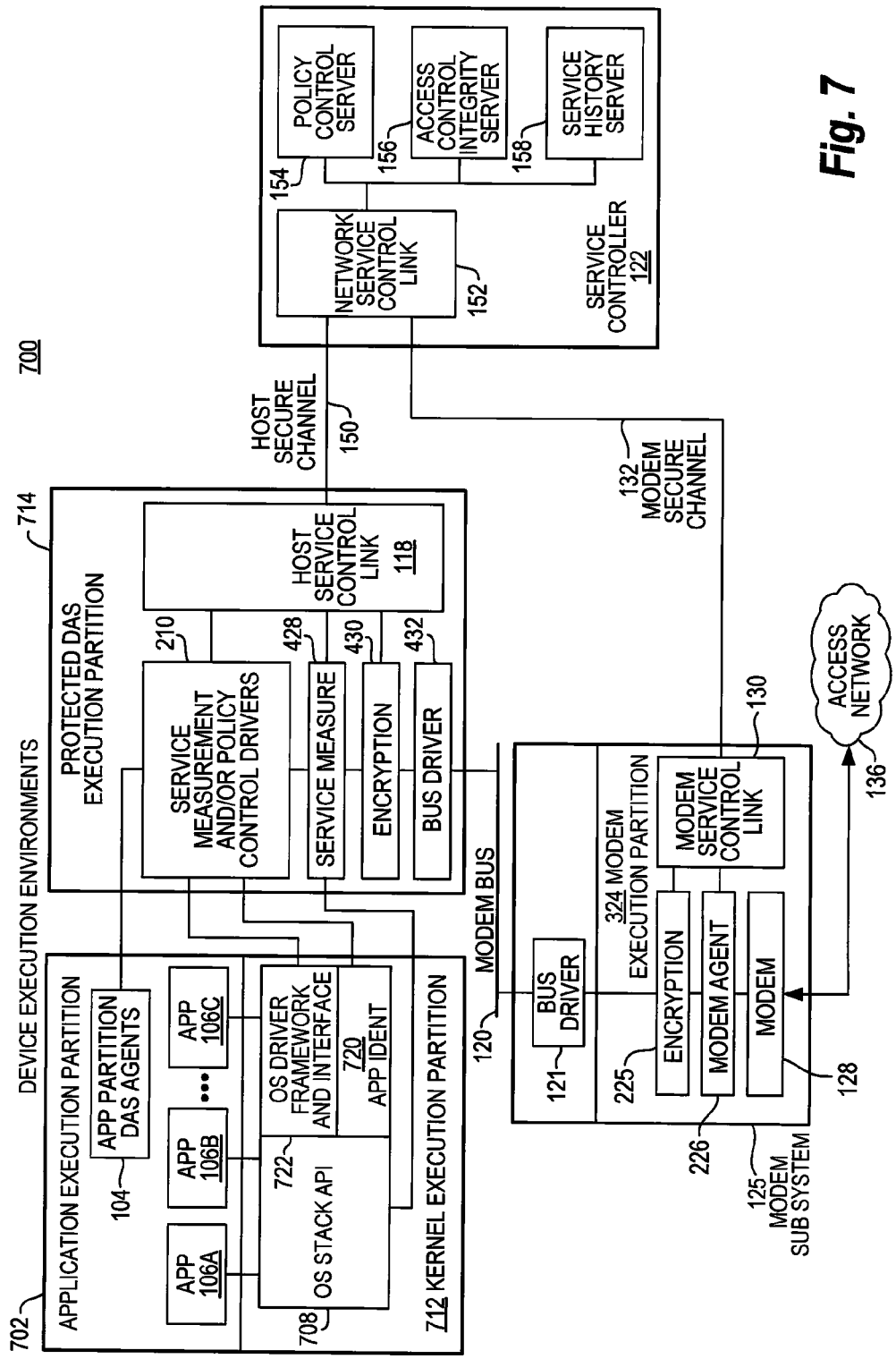
FIG. 7 illustrates another secure execution environment for device assisted services in accordance with some embodiments.

FIG. 7 illustrates another secure execution environment 700 for device assisted services in accordance with some embodiments. In particular, FIG. 7 illustrates DAS agents that do not replace the OS network stack elements, but instead one or more DAS agents are comprised of device driver programs that interface into the network stack and pass traffic information or actual traffic back and forth with the stack. These device driver interface constructs are labeled OS driver framework and interface 722 in FIG. 7 as similarly shown in and described with respect to FIG. 2, along with OS stack API 708, which includes application identifier function 720 as similarly discussed above with respect to FIG. 6, and are executed in kernel execution partition 712. Also, as shown, application partition DAS agents 104 are executed in application execution partition 702. The main difference between the embodiment in FIG. 7 and that shown in and described with respect to FIG. 2 is that the service measure agent 428, modem encryption agent 430, and modem driver agent 432 are executed in the protected DAS partition 714, as shown in FIG. 7. For example, this provides for enhanced service control security as described herein with respect to various embodiments.

Figure 8:
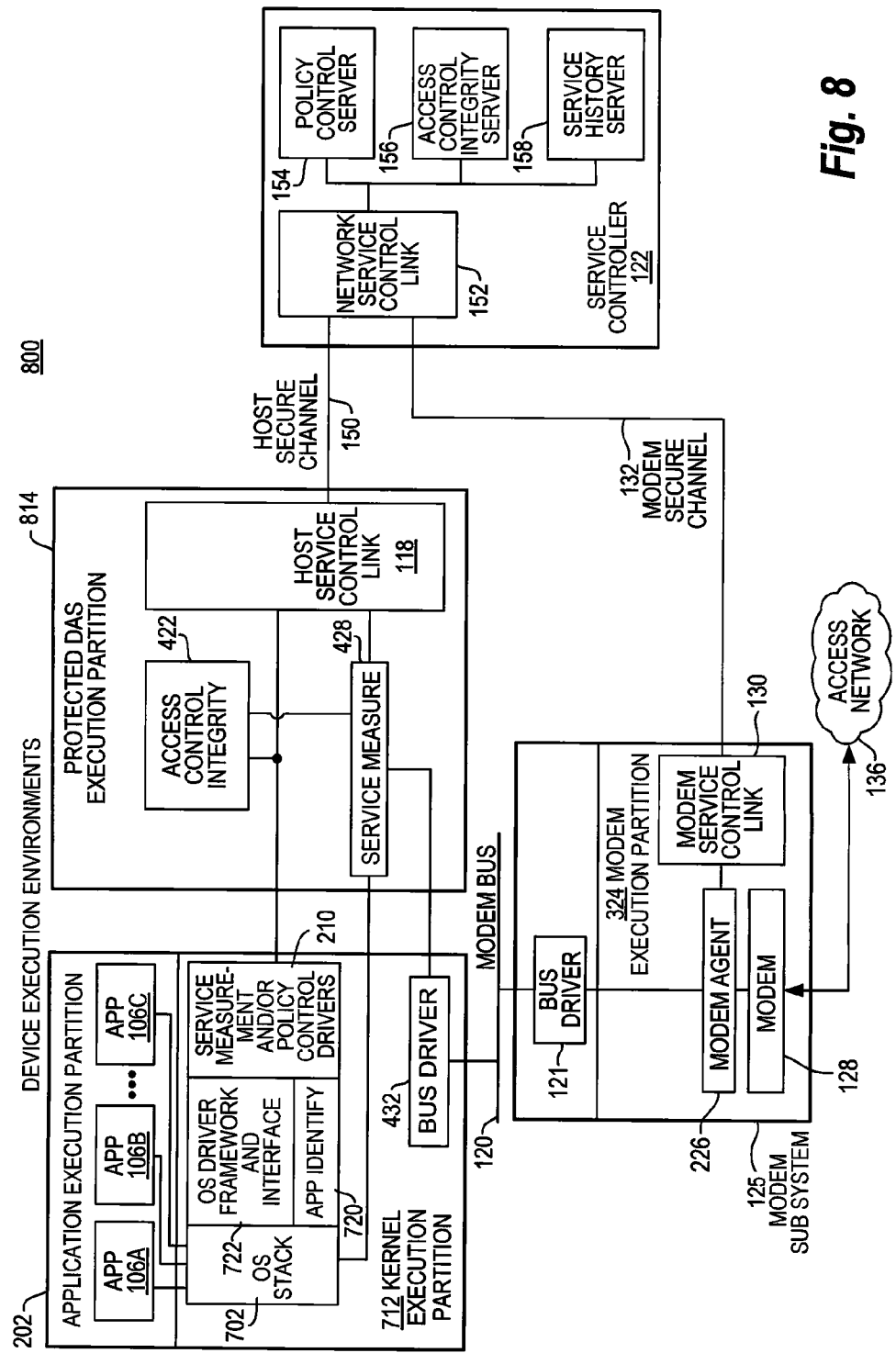
FIG. 8 illustrates another secure execution environment for device assisted services in accordance with some embodiments.

FIG. 8 illustrates another secure execution environment 800 for device assisted services in accordance with some embodiments. In particular, FIG. 8 illustrates a more simplified embodiment that is similar to that of FIG. 7. In FIG. 8, only an access control integrity agent 422 and a service measure 428 are executed in protected DAS partition 814, and the bus driver 432 and the service measurement and/or policy control drivers 210 are executed in the kernel execution partition 712. This embodiment illustrates that provided that at least one protected service measure is provided on the device, then the DAS service control integrity can be very high. For example, if it is not possible to access the program code or control traffic for the service measure agent 428, and the host service control link 118 except through the encrypted control channel from the service controller 122, then this simplified configuration can be almost as secure as that possible with network based service measures. It will now be apparent to one of ordinary skill in the art that this technique similarly applies to a service measure and control link similarly implemented in a protected modem execution partition 324. In some embodiments, the access control integrity agent 422 provides additional security, for example, in the event that the protected DAS partition 814 is breached or compromised.

Figure 9:
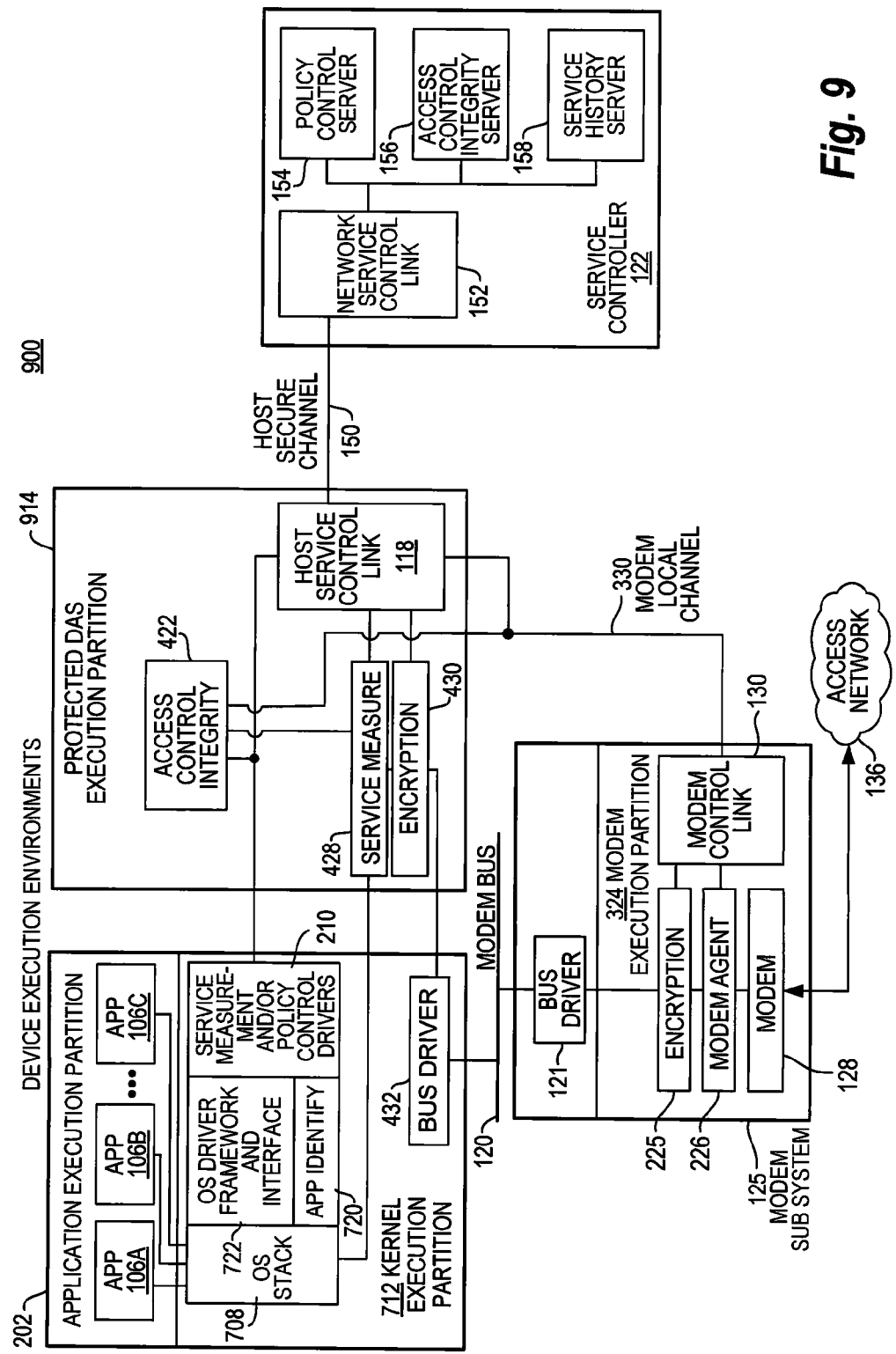
FIG. 9 illustrates another secure execution environment for device assisted services in accordance with some embodiments.

FIG. 9 illustrates another secure execution environment 900 for device assisted services in accordance with some embodiments. In particular, FIG. 9 illustrates an embodiment similar to that of FIG. 8 except that, in particular, in addition to the service measure being executed in protected DAS partition 914, the modem encryption agent 430 is also implemented in/executed in the protected DAS partition 914. For example, this prevents unauthorized software from defeating the service measurements and/or service controls by going around the network stack directly to the modem.

Figure 10:
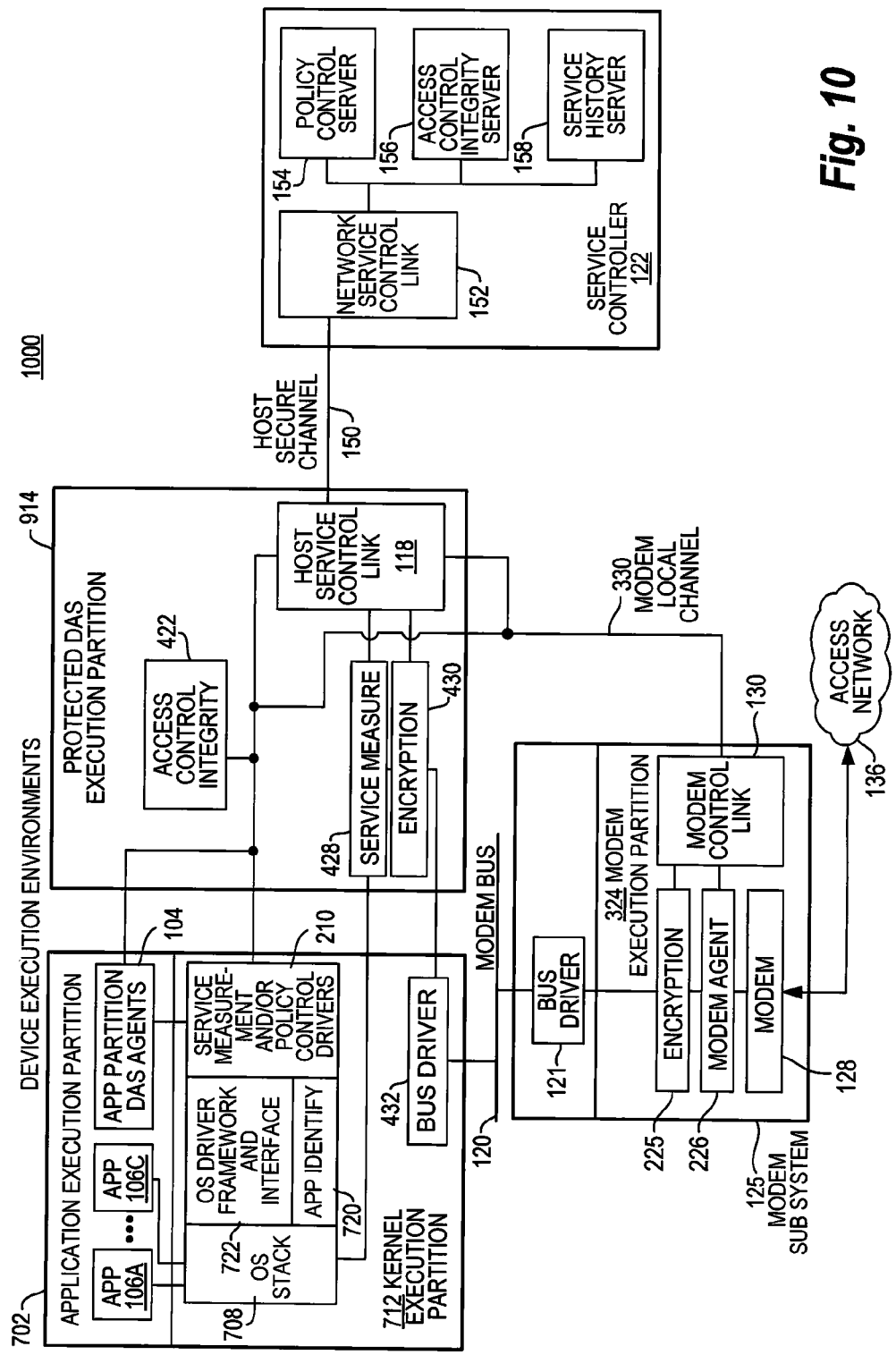
FIG. 10 illustrates another secure execution environment for device assisted services in accordance with some embodiments.

FIG. 10 illustrates another secure execution environment 1000 for device assisted services in accordance with some embodiments. In particular, FIG. 10 illustrates an embodiment similar to that of FIG. 9 except that, in particular, there are additional app partition DAS agents 104 executing in the application execution partition 702. For example, this illustrates that some DAS agents can be implemented in application space (e.g., UI agent, policy control agent, and various other DAS agents as described herein) while still maintaining a high level of service measurement and/or control security as long as there are a few key measures and/or controls implemented in protected execution partitions using the various techniques described herein.

Figure 11:
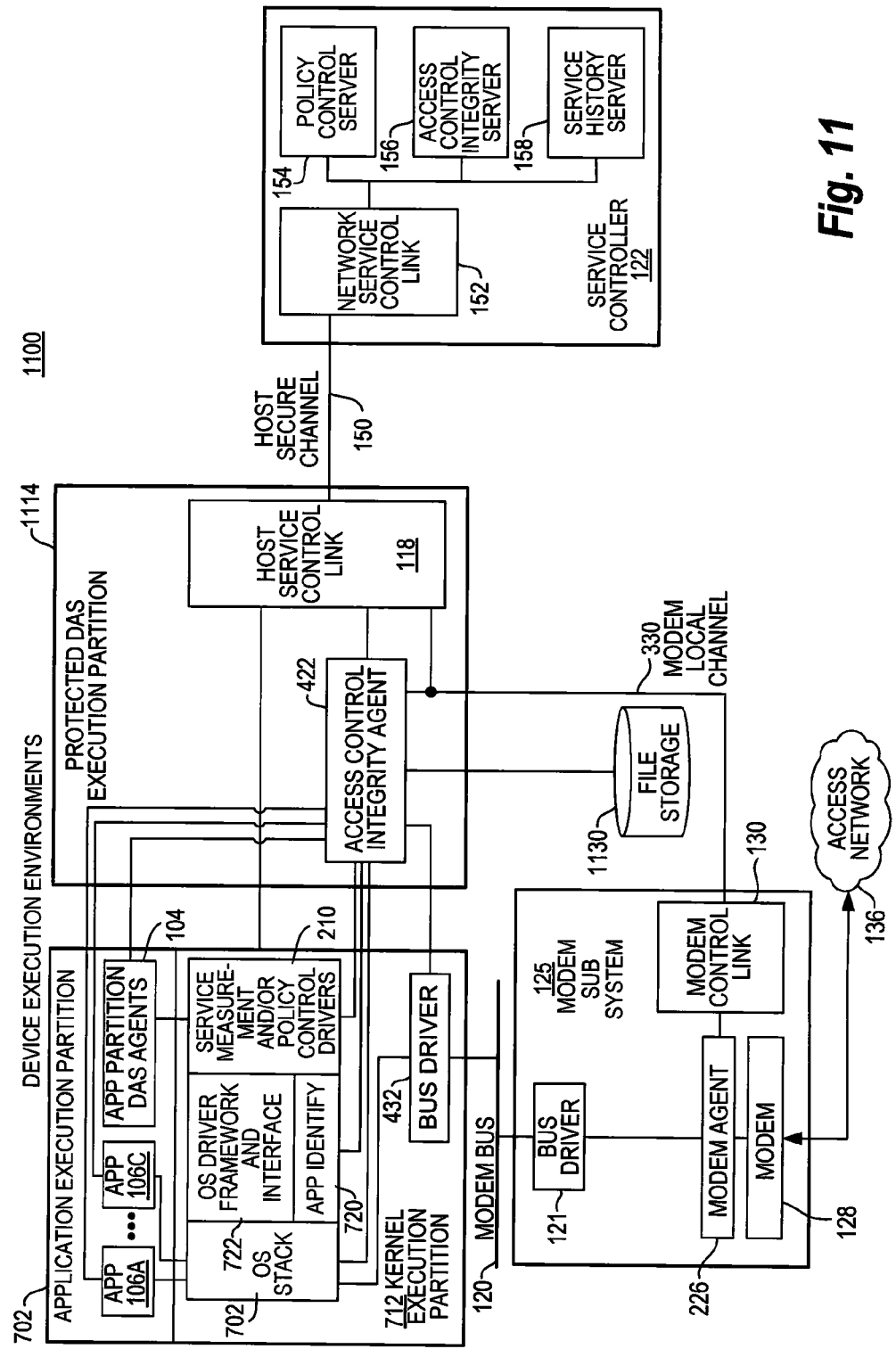
FIG. 11 illustrates another secure execution environment for device assisted services in accordance with some embodiments.

FIG. 11 illustrates another secure execution environment 1100 for device assisted services in accordance with some embodiments. In particular, FIG. 11 illustrates how the server cloud can be assisted by the on board access control integrity agent to detect tampering with other service measurement(s) and/or control agent(s), or to protect the service measurement and/or control system from being attacked by malware and/or otherwise comprised. As shown, the access control integrity agent 422 executes inside the protected DAS partition 1114 and is in communication with file storage 1130 (e.g., for persistently maintaining device status and/or other settings or status or monitoring information). The access control integrity agent 422 performs the various access control integrity check functions as, for example, described herein with respect to various embodiments, and, in some embodiments, in coordination with the servers over the secure control channel (e.g., host secure channel 150). In some embodiments, the access control integrity agent 422 can send the service controller 122 information about the other service measurements and/or control agents so that the service controller 122 can determine if the agents are working properly or have been tampered with or otherwise compromised. For example, such information can include sections of code, hashes, code segments, code variations from a previous image, code variations from a historical image, responses to queries, checksums, observations of operating behavior or patterns, service usage, policy implementation behavior, and/or other information that may be indicative of tampering, corruption, and/or a compromise of any of the device agents/measures. In some embodiments, the access control integrity agent 422 checks the operating environment for signs of malware signatures, or sends application and/or driver information or other information about the operating environments to the servers for further processing to detect malware. In some embodiments, the access control integrity agent 422 performs basic operations on protected DAS partition memory, kernel execution partition memory areas, application execution partition memory areas, on disk storage areas or on other file storage areas to detect known malware hashes or signatures, etc., or the access control integrity agent 422 can send the hashes to the servers for comparison against malware databases (e.g., to compare against signatures for known malware or for further behavioral based or other security/malware detection techniques).

In some embodiments, the DAS system is implemented in a manner that is robust to losses in service control link (e.g., coverage outages on a WWAN link or loss of connection on a wired link). In some embodiments, the DAS system to be implemented in a manner that is robust to one or more server elements in the service controller going offline or failing for any reason. The following embodiments facilitate these techniques, as described below.

In some embodiments, it is advantageous for one or more of the device assisted service agents to maintain a record of the service usage reports and/or other reporting that is provided to the service controller regarding device service control state (e.g., present service plan settings, current service usage policy settings, current user preference settings, current DAS settings, current encrypted control channel and/or local encrypted communication channel key information, current DAS agent status reports, current DAS agent security state reports, current ambient service usage and/or transaction records, current service control integrity threat reports, user status information, device status information, application status information, device location, device QOS state, and/or other state and/or settings information). In addition to such information that exists on the device and is reported to the service controller, additional service information can be derived and recorded in the service controller, such as information received from outside the device and/or analysis of the device reported information (e.g., network based service usage measures, analysis of device service usage, comparison of device reports with other information, analysis of access control integrity agent reports, information received from roaming networks, information input to the service controller from parental control terminals, enterprise control terminals, virtual service provider control terminals, access network authorization information, service integrity violation level, and many other types of information used to properly measure and/or control the device services). For example, the information reported from the device and received or derived outside the device that is required to adequately define the actions needed from the service controller to maintain proper DAS system operation is sometimes referred to herein as the "device service state."

In some embodiments, the service controller functions are highly scalable and can be executed on a number of hardware and software platforms (e.g., different virtual machines in a server, different servers in a data center, or different servers located in different data centers). For example, in such embodiments the service controller can be designed so that the programs that execute the various service controller server functions can derive all of the information necessary to properly manage the device at any moment in time by knowing past device service state and current service state that adequately define the next set of actions the service controller needs to implement to properly maintain the DAS system operation. By designing the system in this way, if the server that is running the service controller server functions for any given device in question were to go down or become disconnected from the device, then another server could later resume proper operation of the DAS system by assigning another service controller server function to the device and recovering or restoring the necessary past device service state and the necessary current device service state.

For example, this can be accomplished in some embodiments as described below. The service controller saves the current device service state into a common database (e.g., which can be centralized or distributed) that is available to all service controller server functions. The device service state is saved each time the device communicates with the service controller, or at regular time intervals, or a combination of both. The device retains its current and past service state reports even after they are reported at least until the service controller sends the device a message confirming that the service controller has saved a given device service state. Once the device receives this save confirmation for a given device state report then it is no longer required to retain that particular device state report once the device has no further use for it. In this manner, if a service controller server function goes down then a save confirmation for one or more reported device states is not transmitted to the device by the service controller, and the device can retain that report. A server load balancer detects that a given service controller server function has gone down, looks up the devices that were being controlled by that service controller server function, finds that the device in question was one of those devices and re-assigns a new service controller server function (either in the same data center or in another data center) to control the device in question. The newly assigned service controller server function then recovers all past device states that were recorded in the service controller database and are required to properly manage the DAS system, and then asks the device to transmit or re-transmit all device state reports that were not saved in the service controller database. Once the device transmits or re-transmits the requested information, the newly assigned service controller function then has the information it needs to properly manage the DAS system, it saves all the reported device state information, and then sends save confirmations to the device so that the device need no longer retain the older service state reports. The newly assigned service controller server function can then resume the DAS system operation with a set of actions that are identical or very similar to the actions that would have been taken by the original service controller server function if it had not gone down. One of ordinary skill in the art will now appreciate that the above techniques can also be used to accommodate temporary losses in the connection between the device and the service controller. For example, such techniques provide for a highly scalable and robust approach to implement a distributed service controller across multiple data centers for reliable service redundancy. In some embodiments, the past device service state information is saved in the protected DAS execution partition and/or the modem execution partition, for example, so that it is protected from corruption.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more modems for enabling a communications device to communicate over at least a first wireless network and a second wireless network;
one or more processors of the communications device configured to:
determine that the communications device is connected to the first wireless network;
based on the determination that the communications device is connected to the first wireless network, implement a first service profile executed at least in part in a secure execution environment, the first service profile for assisting control of usage by the communications device of a service over the first wireless network, wherein the service profile includes one or more service policy settings, at least one of the one or more service policy settings for assisting in controlling access to the service over the first wireless network; and
monitor an attempted or successful use of the service over the first wireless network; and
memory of the communications device coupled to the one or more processors and configured to provide the one or more processors with instructions.

2. The system recited in claim 1, wherein the one or more processors of the communications device are further configured to send information about the monitored attempted or successful use of the service to a network element, wherein the information comprises service usage information.

3. The system recited in claim 1, wherein the communications device is a mobile communications device or an intermediate networking device, and the service includes one or more Internet based services.

4. The system recited in claim 1, wherein the communications device includes a modem, and at least one of the one or more processors of the communications device is located in the modem.

5. The system recited in claim 1, wherein the communications device is a mobile communications device, and wherein the service includes one or more Internet based services, and wherein the mobile communications device includes one or more of the following: a mobile phone, a personal digital assistant (PDA), an eBook reader, a music device, an entertainment device, a gaming device, a computer, laptop, a netbook, a tablet, and a home networking system.

6. The system recited in claim 1, wherein the first service profile allows for access to the service with service capabilities that are controlled based on one or more of the following: a period of time, a network address, a service type, a content type, an application type, a bandwidth, and a data usage.

7. The system recited in claim 1, wherein the one or more service policy settings include one or more of the following: an access control setting, a traffic control setting, a billing system setting, a user notification setting, a user notification with acknowledgement setting, a user notification with synchronized service usage information setting, a user privacy setting, a user preference setting, an authentication setting, an admission control setting, an application access setting, a content access setting, a transaction setting, a network management communication setting, and a device management communication setting.

8. The system recited in claim 1, wherein the secure execution environment includes a protected device assisted service execution partition.

9. The system recited in claim 1, wherein the secure execution environment includes a protected device assisted service execution partition, and wherein the protected device assisted service execution partition is implemented at least in part as a hardware partition.

10. The system recited in claim 1, wherein the secure execution environment includes a protected device assisted service execution partition, and wherein the protected device assisted service execution partition is implemented at least in part as a software partition.

11. The system recited in claim 1, wherein the secure execution environment includes a protected device assisted service execution partition, and wherein the protected device assisted service execution partition is implemented at least in part in a virtual machine executed on the one or more processors of the communications device.

12. The system recited in claim 1, wherein the secure execution environment includes a protected device assisted service execution partition, and the one or more processors of the communications device are further configured to:
execute one or more device assisted service agents in the protected device assisted service execution partition, wherein the one or more device assisted service agents executed in the protected device assisted service execution partition are in communication with a network element.

13. The system recited in claim 1, wherein the secure execution environment includes a protected device assisted service execution partition, and the one or more processors of the communications device are further configured to:
execute one or more device assisted service agents in the protected device assisted service execution partition, wherein the one or more device assisted service agents executed in the protected device assisted service execution partition include a device agent for providing a service usage measure.

14. The system recited in claim 1, wherein the secure execution environment includes a protected device assisted service execution partition, and the one or more processors of the communications device are further configured to:
execute one or more device assisted service agents in the protected device assisted service execution partition, wherein the one or more device assisted service agents executed in the protected device assisted service execution partition are in secure communication with a network element, and wherein the secure communication with the network element includes encrypted communications.

15. The system recited in claim 1, wherein the communications device includes a modem, and at least one of the one or more processors of the communications device is located in the modem, and wherein the secure execution environment includes a secure modem execution partition that is implemented using a hardware or software partition, and wherein the one or more processors of the communications device are further configured to:

execute one or more device assisted service agents in the secure modem execution partition, wherein the device assisted service agents executed in the secure modem execution partition are in communication with a network element.

16. The system recited in claim 1, wherein the communications device includes a modem, and at least one of the one or more processors of the communications device is located in the modem, and wherein the secure execution environment includes a secure modem execution partition that is implemented using a hardware or software partition, and wherein the one or more processors of the communications device are further configured to:
execute one or more device assisted service agents in the secure modem execution partition, wherein the device assisted service agents executed in the secure modem execution partition are in secure communication with a network element, and wherein the secure communication with the network element includes encrypted communications.

17. The system recited in claim 1, wherein the communications device includes a modem, and at least one of the one or more processors of the communications device is located in the modem, and wherein the secure execution environment includes a secure modem execution partition that is implemented using a hardware or software partition, and wherein the one or more processors of the communications device are further configured to:
execute one or more device assisted service agents in the secure modem execution partition, wherein one or more device assisted service agents executed in the secure modem execution partition include a modem agent for providing service usage measure.

18. The system recited in claim 1, wherein the one or more processors of the communications device are further configured to:
execute a first set of one or more device assisted service agents in a kernel execution partition; and
execute a second set of one or more device assisted service agents in the protected device assisted service execution partition, wherein at least one agent of the second set of one or more device assisted service agents is in communication with a network element.

19. The system recited in claim 1, wherein the one or more processors of the communications device are further configured to:
execute a first set of one or more device assisted service agents in an application execution partition;
execute a second set of one or more device assisted service agents in a kernel execution partition; and
execute a third set of one or more device assisted service agents in the protected device assisted service execution partition, wherein at least one agent of the third set of one or more device assisted service agents is in communication with a network element.

20. The system recited in claim 1, wherein the one or more processors of the communications device are further configured to:
execute a first set of one or more device assisted service agents in an application execution partition;
execute a second set of one or more device assisted service agents in a kernel execution partition;
execute a third set of one or more device assisted service agents in a modem execution partition; and
execute a fourth set of one or more device assisted service agents in the protected device assisted service execution partition, wherein at least one agent of the fourth set of one or more device assisted service agents is in communication with a network element.

21. The system recited in claim 1, wherein the one or more processors of the communications device are further configured to:
execute a first set of one or more device assisted service agents in an application execution partition;
execute a second set of one or more device assisted service agents in a kernel execution partition;
execute a third set of one or more device assisted service agents in a modem execution partition; and
execute a fourth set of one or more device assisted service agents in the protected device assisted service execution partition, wherein at least one agent of the fourth set of one or more device assisted service agents is in communication with a network element, and wherein the fourth set of one or more device assisted service agents comprises one or more of the following: an application identifier agent, an access control integrity agent, a policy control agent, a policy implementation agent, and a service usage measure agent.

22. The system recited in claim 1, wherein the one or more processors of the communications device are further configured to:
execute a first set of one or more device assisted service agents in an application execution partition;
execute a second set of one or more device assisted service agents in a kernel execution partition;
execute a third set of one or more device assisted service agents in a modem execution partition, wherein the modem execution partition is in communication with the protected device assisted execution partition using a modem local channel; and
execute a fourth set of one or more device assisted service agents in the protected device assisted service execution partition, wherein at least one agent of the fourth set of one or more device assisted service agents is in communication with a network element, and wherein the fourth set of one or more device assisted service agents comprises one or more of the following: an application identifier agent, an access control integrity agent, a policy control agent, a policy implementation agent, and a service usage measure agent.

23. The system recited in claim 1, wherein the one or more processors of the communications device are further configured to:
execute a first set of one or more device assisted service agents in an application execution partition;
execute a second set of one or more device assisted service agents in a kernel execution partition;
execute a third set of one or more device assisted service agents in a modem execution partition, wherein the modem execution partition is in communication with the protected device assisted execution partition using a modem local channel, and wherein at least one agent of the third set of one or more device assisted service agents comprises a service usage measure agent; and
execute a fourth set of one or more device assisted service agents in the protected device assisted service execution partition, wherein at least one agent of the fourth set of one or more device assisted service agents is in communication with a network element, and wherein the fourth set of one or more device assisted service agents comprises one or more of the following: an application identifier agent, an access control integrity agent, a policy control agent, a policy implementation agent, and a service usage measure agent.

24. A method, comprising:
- determining that a communications device capable of connecting to a first wireless network and to a second wireless network is connected to the first wireless network;
- based on determining that the communications device is connected to the first wireless network, implementing a first service profile executed at least in part in a secure execution environment of the communications device, the first service profile for assisting control of usage by the communications device of a service over the first wireless network, wherein the service profile includes one or more service policy settings for assisting in controlling access to the service over the first wireless network; and
- monitoring an attempted or successful use of the service over the first wireless network.

25. A computer program product, the computer program product being embodied in a non-transitory computer readable storage medium and comprising computer instructions for:
- determining that a communications device capable of connecting to a first wireless network and to a second wireless network is connected to the first wireless network;
- based on determining that the communications device is connected to the first wireless network, implementing a first service profile executed at least in part in a secure execution environment of the communications device, the first service profile for assisting control of usage by the communications device of a service over the first wireless network, wherein the service profile includes one or more service policy settings for assisting in controlling access to the service over the first wireless network; and
- monitoring an attempted or successful use of the service over the first wireless network.

26. The system recited in claim 1, wherein the first wireless network is a roaming network, and wherein assisting control of usage by the communications device of a service over the first wireless network comprises disallowing communications on the roaming network.

27. The system recited in claim 1, wherein the first wireless network is a roaming network, and wherein assisting control of usage by the communications device of a service over the first wireless network comprises restricting at least an aspect of communications on the roaming network.

28. The system recited in claim 1, wherein the first wireless network is a cellular network, and wherein assisting control of usage by the communications device of a service over the first wireless network comprises disallowing communications on the cellular network.

29. The system recited in claim 1, wherein the first wireless network is a cellular network, and wherein assisting control of usage by the communications device of a service over the first wireless network comprises restricting at least an aspect of communications on the cellular network.

30. The system recited in claim 1, wherein the one or more processors are further configured to:
- determine that the communications device is connected to the second wireless network; and
- implement a second service profile, the second service profile for assisting control of usage by the communications device of the service over the second wireless network.

31. The system recited in claim 30, wherein the one or more service policy settings are one or more first service policy settings, and wherein the second service profile comprises one or more second service policy settings.

32. The system recited in claim 30, wherein the one or more processors are configured to implement the second service profile by executing the second service profile at least in part in the secure execution environment.

33. The system recited in claim 1, wherein the one or more processors are further configured to:
- determine that the communications device is connected to the second wireless network; and
- refrain from implementing the first service profile based on the determination that the communications device is connected to the second wireless network.

34. The system recited in claim 1, wherein assisting control of usage by the communications device of a service over the first wireless network comprises assisting in providing the service with an identified quality of service (QOS).

35. The system recited in claim 1, wherein assisting control of usage by the communications device of a service over the first wireless network comprises assisting in disallowing use of the service.

36. The system recited in claim 1, wherein assisting control of usage by the communications device of a service over the first wireless network comprises assisting in restricting use of the service.

37. The system recited in claim 1, wherein assisting control of usage by the communications device of a service over the first wireless network comprises assisting in applying a traffic shaping to the service.

38. The system recited in claim 1, wherein assisting control of usage by the communications device of a service over the first wireless network comprises assisting in controlling a particular service usage activity.

39. The system recited in claim 38, wherein assisting in controlling a particular service usage activity comprises disallowing the particular service usage activity.

40. The system recited in claim 38, wherein assisting in controlling a particular service usage activity comprises restricting the particular service usage activity.

41. The system recited in claim 38, wherein assisting in controlling a particular service usage activity comprises traffic shaping the particular service usage activity.

42. The system recited in claim 38, wherein in controlling a particular service usage activity comprises assisting in providing an identified quality of service (QOS) to the particular service usage activity.

43. The system recited in claim 38, wherein the particular service usage activity comprises communications associated with a particular application.

44. The system recited in claim 38, wherein the particular service usage activity comprises: communications over a roaming network, communications over a cellular network, communications associated with a particular source or destination, communications associated with a particular traffic type, communications associated with a transaction service, communications associated with an advertising service, communications associated with an application type, communications associated with a particular network communication end point, or communications associated with a particular transaction type.

45. The system recited in claim 44, wherein the particular traffic type comprises best-effort traffic, real-time traffic, voice over Internet protocol (VOIP) traffic, live video traffic, streaming traffic, multi-cast traffic, uni-cast traffic, point-to-point traffic, traffic associated with a file type, traffic associated with an application, traffic with a particular priority, traffic without an assigned priority, traffic associated with the first wireless network, or traffic associated with the second wireless network.

46. The system recited in claim 1, wherein at least a portion of the first service profile is based on a user preference.

47. The system recited in claim 46, further comprising a user interface, and wherein the one or more processors are further configured to obtain the user preference through the user interface.

48. The system recited in claim 1, wherein assisting control of usage by the communications device of a service over the first wireless network comprises providing differentiated quality of service (QOS) to two or more service usage activities.

49. The system recited in claim 48, wherein the differentiated QOS is based on an assigned QOS hierarchy.

50. The system recited in claim 48, wherein at least one of the two or more service usage activities comprises: communications over a roaming network, communications over a cellular network, communications associated with a particular source or destination, communications associated with a particular application, communications associated with a particular traffic type, communications associated with a transaction service, communications associated with an advertising service, communications associated with an application type, communications associated with a particular network communication end point, and communications associated with a particular transaction type.

51. The system recited in claim 50, wherein the particular traffic type comprises best-effort traffic, real-time traffic, voice over Internet protocol (VOIP) traffic, live video traffic, streaming traffic, multi-cast traffic, uni-cast traffic, point-to-point traffic, traffic associated with a file type, traffic associated with an application, traffic with a particular priority, traffic without an assigned priority, or traffic associated with a particular network.

52. The system recited in claim 1, wherein the service is associated with a particular quality of service (QOS), and wherein first service profile assists in providing the service with the particular QOS.

53. The system recited in claim 1, wherein the first service profile assists in authorizing the communications device to use the wireless network.

54. The system recited in claim 1, wherein the one or more processors are further configured to obtain at least a portion of the first service profile from the network element.

55. The system recited in claim 1, wherein the one or more processors are further configured to obtain configuration information from a network element, the configuration information for assisting the one or more processors in modifying or allowing modifications to at least one service policy setting of the one or more service policy settings.

56. The system recited in claim 55, wherein the communications device is an intermediate networking device.

57. The system recited in claim 1, wherein the one or more processors are further configured to obtain at least one of the one or more service policy settings from a network element.

58. The system recited in claim 1, wherein the one or more processors are further configured to send information about the monitored attempted or successful use of the service to a network element.

59. The system recited in claim 58, wherein the one or more processors are further configured to obtain a message from the network element, the message confirming receipt of the information about the monitored attempted or successful use of the service.

60. The system recited in claim 58, wherein the information about the monitored attempted or successful use of the service comprises quality of service (QOS) information.

61. The system recited in claim 58, wherein the network element is a quality of service (QOS) control element.

62. The system recited in claim 1, wherein the one or more processors of the communications device are configured to implement the first service profile based on the monitored attempted or successful use of the service over the first wireless network.

* * * * *

UNITED STATES PATENT AND TRADEMARK OFFICE
CERTIFICATE OF CORRECTION

PATENT NO.        : 8,391,834 B2
APPLICATION NO.   : 12/694445
DATED             : March 5, 2013
INVENTOR(S)       : Raleigh Page 1 of 1

It is certified that error appears in the above-identified patent and that said Letters Patent is hereby corrected as shown below:

In the Claims

Column 25, line 36 claim 52 the phrase "wherein first service profile" should be changed to --wherein the first service profile--.

Signed and Sealed this
Thirteenth Day of May, 2014

Michelle K. Lee
*Deputy Director of the United States Patent and Trademark Office*